(12) United States Patent
Dayanand et al.

(10) Patent No.: US 12,313,044 B2
(45) Date of Patent: May 27, 2025

(54) HEAT RECOVERY AND UTILIZATION FROM SUBSEA FIELD OPERATIONS

(71) Applicant: Chevron U.S.A. Inc., San Ramon, CA (US)

(72) Inventors: Nikhil Dayanand, Houston, TX (US); Brent D. Eilerts, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/723,652

(22) PCT Filed: Jan. 7, 2022

(86) PCT No.: PCT/US2022/011531
§ 371 (c)(1),
(2) Date: Jun. 24, 2024

(87) PCT Pub. No.: WO2023/132832
PCT Pub. Date: Jul. 13, 2023

(65) Prior Publication Data
US 2024/0418156 A1  Dec. 19, 2024

(51) Int. Cl.
*F03G 4/00* (2006.01)
*F24T 50/00* (2018.01)
*H02K 7/18* (2006.01)
*H02K 9/20* (2006.01)

(52) U.S. Cl.
CPC ............ *F03G 4/035* (2021.08); *F03G 4/029* (2021.08); *F24T 50/00* (2018.05); *H02K 7/1823* (2013.01); *H02K 9/20* (2013.01)

(58) Field of Classification Search
CPC .......... F03G 4/035; F03G 4/029; F24T 50/00; H02K 7/1823; H02K 9/20

USPC .......................................................... 290/52
See application file for complete search history.

(56) References Cited

U.S. PATENT DOCUMENTS

| 2,235,303 | A | * | 3/1941 | Stucker | .................. F22B 1/282 392/399 |
| 11,441,394 | B1 | * | 9/2022 | Joshi | .................. E21B 41/0085 |
| 2008/0023963 | A1 | * | 1/2008 | Perich | ...................... C02F 1/04 202/185.1 |

(Continued)

FOREIGN PATENT DOCUMENTS

WO     2014086417 A1    6/2014

OTHER PUBLICATIONS

Harry Kim, PCT International Search Report, Mar. 24, 2022, 2 pages, US as receiving office.

(Continued)

*Primary Examiner* — Charles Reid, Jr.
(74) *Attorney, Agent, or Firm* — Smith & Woldesenbet Law Group, PLLC

(57) ABSTRACT

A system for utilizing excess heat during a subsea field operation can include a subsea manifold configured to transfer a subterranean resource to a pipeline located subsea, where the subterranean resource radiates the excess heat after being transferred out of the subsea manifold. The system can also include a subsea power generation system that receives the excess heat from the subterranean resource as the subterranean resource is transferred from the subsea manifold to the pipeline, where subsea power generation system uses the excess heat to generate electrical power.

20 Claims, 10 Drawing Sheets

(56) References Cited

U.S. PATENT DOCUMENTS

| | | |
|---|---|---|
| 2009/0120103 A1 | 5/2009 | Grimseth et al. |
| 2009/0152868 A1 | 6/2009 | Beck |
| 2011/0138809 A1 | 6/2011 | Ramaswamy et al. |
| 2011/0167819 A1* | 7/2011 | Lakic ................... H02K 7/1823 |
| | | 60/641.2 |
| 2016/0222761 A1 | 8/2016 | Cain et al. |
| 2019/0088845 A1* | 3/2019 | Sugi ....................... H02K 19/16 |

OTHER PUBLICATIONS

Harry Kim, Written Opinion of the International Search Authority, Mar. 24, 2022, 6 pages, US as receiving office.

* cited by examiner

HEAT RECOVERY AND UTILIZATION FROM SUBSEA FIELD OPERATIONS

CROSS-REFERENCE TO RELATED APPLICATIONS

This application claims priority under 35 U.S.C. § 371 to Patent Cooperation Treaty Patent Application Serial Number PCT/US2022/011531, titled "Heat Recovery And Utilization From Subsea Field Operations" and filed on Jan. 7, 2022, the entire contents of which are hereby incorporated herein by reference.

TECHNICAL FIELD

The present application is related to offshore field operations and, more particularly, to systems and methods for heat recovery and utilization from subsea field operations.

BACKGROUND

In subsea field operations, one or more subassemblies or stand-alone components are placed on the sea floor for use in one or more stages (e.g., exploration, completion, production) of a field operation. Some of these subassemblies or stand-alone components are used directly in support of a stage of a field operation, while other subassemblies and/or stand-alone components may be used to provide an ancillary service or serve an ancillary function to the stage of the field operation. One such ancillary function can be using excess energy to generate power that is used by a different component or subassembly in the stage of the field operation.

SUMMARY

In general, in one aspect, the disclosure relates to a system for utilizing excess heat during a subsea field operation. The system can include a subsea manifold configured to transfer a subterranean resource to a pipeline located subsea, where the subterranean resource radiates the excess heat after being transferred out of the subsea manifold. The system can also include a subsea power generation system that receives the excess heat from the subterranean resource as the subterranean resource is transferred from the subsea manifold to the pipeline, where subsea power generation system uses the excess heat to generate electrical power.

In another aspect, the disclosure relates to a subsea power generation system for generating electrical power subsea during a subsea field operation. The subsea power generation system can include a subsea heat exchanger configured to receive excess heat radiated from a subterranean resource being transferred from a subsea manifold to a pipeline located subsea, where the excess heat is used to heat a working fluid in the subsea heat exchanger to a heated state. The subsea power generation system can also include a turbine/generator that receives working fluid in the heated state from the subsea heat exchanger, where energy from the working fluid in the heated state is used by the turbine/generator to generate the electrical power subsea.

In yet another aspect, the disclosure relates to a method for utilizing excess heat during a subsea field operation. The method can include facilitating, by a subsea power generation system, transfer of the excess heat radiated from a subterranean resource to a working fluid as the subterranean resource flows from a subsea manifold to a subsea pipeline. The method can also include directing the working fluid, heated by the excess heat, to a turbine/generator of the subsea power generation system. The method can further include sending electrical power, generated by the turbine/generator using energy from the working fluid, to a subsea electrical load.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
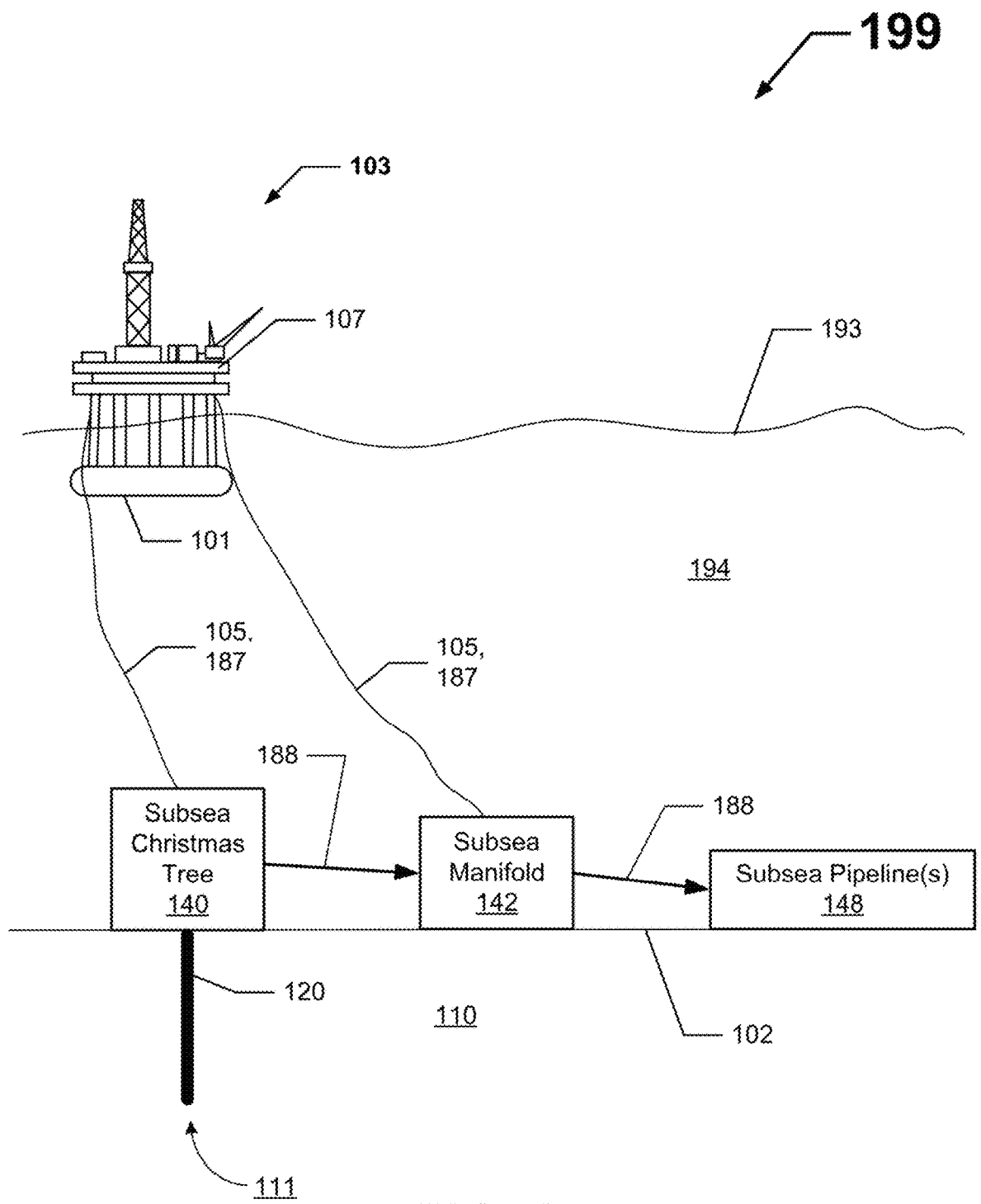
FIG. 1 shows a subsea field system currently used in the art.

The example embodiments discussed herein are directed to systems and methods for heat recovery and utilization from subsea field operations. Subsea field operations can involve drilling, completing, transporting, and or producing a subterranean resource that is extracted from a subterranean formation. Examples of a subterranean resource can include, but are not limited to, natural gas, oil, and water. A subsea field operation can last for any duration of time (e.g., one month, one year, one decade) and can be continuous or have multiple interruptions or pauses. Example embodiments of systems and methods for heat recovery and utilization from subsea field operations can be rated for use in hazardous environments. The systems (including portions thereof) with which example embodiments can be used are located, at least in part, under water (e.g., a sea, an ocean, a lake), also called subsea herein.

Example embodiments used for heat recovery and utilization from subsea field operations includes multiple components, where a component can be made from a single piece (as from a cast, a mold, or an extrusion). When a component (or portion thereof) of an example embodiment is made from a single piece, the single piece can be cut out, bent, stamped, and/or otherwise shaped to create certain features, elements, or other portions of the component. Alternatively, a component (or portion thereof) of an example embodiment can be made from multiple pieces that are mechanically coupled to each other. In such a case, the multiple pieces can be mechanically coupled to each other using one or more of a number of coupling methods, including but not limited to adhesives, welding, fastening devices (e.g., bolts), compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system for heat recovery and utilization from subsea field operations) can be made of one or more of a number of suitable materials, including but not limited to metal (e.g., stainless steel), ceramic, rubber, glass, and plastic.

When used in certain systems (e.g., for certain subterranean field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), the International Association of Classification Societies (IACS), and the Occupational Safety and Health Administration (OSHA). Also, as discussed above, example systems for heat recovery and utilization from subsea field operations can be used in hazardous environments, and so example systems for heat recovery and utilization from subsea field operations can be designed to comply with industry standards that apply to hazardous environments.

If a component of a figure is described but not expressly shown or labeled in that figure, the label used for a corresponding component in another figure can be inferred to that component. Conversely, if a component in a figure is labeled but is not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings can be capable of being included in one or more claims that correspond to such one or more particular drawings herein.

Example embodiments of systems for heat recovery and utilization from subsea field operations will be described more fully hereinafter with reference to the accompanying drawings, in which example embodiments of systems for heat recovery and utilization from subsea field operations are shown. Heat recovery and utilization from subsea field operations may, however, be embodied in many different forms and should not be construed as limited to the example embodiments set forth herein. Rather, these example embodiments are provided so that this disclosure will be thorough and complete, and will fully convey the scope of systems for heat recovery and utilization from subsea field operations to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of systems for heat recovery and utilization from subsea field operations. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 199 currently used in the art. The system 199 in this case includes a floating structure 103 in the form of a semi-submersible platform that floats in a large and deep body of water 194. Part (e.g., the topsides 107) of the floating structure 103 is above the water line 193, and at least part (e.g., the hull 101) of the rest of the floating structure 103 is in the water 194 below the water line 193. The floating structure 103 in this case is used for subterranean field operations (also called subsea field operations herein), in which exploration and production phases (also called stages) of the subsea field operation are executed to extract one or more subterranean resources 111 (e.g., oil, natural gas, water, hydrogen gas) from and/or inject resources (e.g., carbon monoxide) into the subterranean formation 110 via a wellbore 120. In alternative embodiments, as when a subsea operation is close to land, the structure 103 can be land-based rather than floating.

To accomplish this, a subsea Christmas tree 140 is disposed toward the top of the wellbore 120 at the subsea surface 102. Piping 188 transfers the subterranean resource 111 from the subsea Christmas tree 140 to a subsea manifold 142. Additional piping 188 transfers the subterranean resource 111 from the subsea manifold 142 to one or more subsea pipelines 148. There can be one or more communication links 105 and/or power transfer links 187 between one or more of the subsea components (e.g., the subsea Christmas tree 140, the subsea manifold 142, one or more of the subsea pipelines 148) and one or more components (e.g., a generator, a controller) disposed on the topsides 107 of the floating structure 103 (or land-based structure 103, as the case may be).

The subsea Christmas tree 140 is a stack of vertical and horizontal valves, spools, pressure gauges, chokes, and/or other components installed as an assembly on a subsea wellhead. The subsea Christmas tree 140 is configured to provide a controllable interface between the wellbore 120 and production facilities (e.g., via the subsea pipeline 148). The various valves of the subsea Christmas tree 140 can be used for such purposes as testing, servicing, regulating, and/or choking the stream of produced subterranean resources 111 coming up from the wellbore 120.

The subsea manifold 142 is an assembly of headers, pipes (e.g., pipes 188) and valves. The subsea manifold 142 is configured to transfer the subterranean resources 111 from the subsea Christmas to one or more of the subsea pipelines 148. In some ways, the subsea manifold 142 acts as a type of flow regulator to distribute the subterranean resource 111 among the various subsea pipelines 148. Similarly, if there are multiple wellbores 120, as from a common pad, the subsea manifold 142 can receive the subterranean resource 111 from one or more of those wellbores 120 and distribute the subterranean resource 111 to one or more of the subsea pipelines 148.

Each subsea pipeline 148 (also sometimes called a submarine pipeline 148) is a series of pipes, coupled end to end, that is laid at or near to the seabed surface 102. A subsea pipeline 148 moves the subterranean resource 111 from the area of the wellbore 120 to some other location, typically for a midstream process (e.g., oil refining, natural gas processing). The piping 188, also located subsea, can include multiple pipes, ducts, elbows, joints, sleeves, collars, and similar components that are coupled to each other (e.g., using coupling features such as mating threads) to establish a network for transporting the subterranean resource 111 from the subsea Christmas tree 140, through the subsea manifold 142, to one or more of the subsea pipelines 148. Each component of the piping 188 can have an appropriate size (e.g., inner diameter, outer diameter) and be made of an appropriate material (e.g., steel) to safely and efficiently handle the pressure, temperature, flow rate, and other characteristics of the subterranean resource 111 at the depth in the water 194.

Each communication link 105 can include wired (e.g., Class 1 electrical cables, electrical connectors, Power Line Carrier, RS485) and/or wireless (e.g., sound or pressure waves in the water 194, Wi-Fi, Zigbee, visible light communication, cellular networking, Bluetooth, Bluetooth Low Energy (BLE), ultrawide band (UWB), WirelessHART, ISA100) technology. A communication link 105 can transmit signals (e.g., communication signals, control signals, data) from one component (e.g., a controller) of the system 199 to another (e.g., a valve on the subsea Christmas tree 140).

Each power transfer link 187 can include one or more electrical conductors, which can be individual or part of one or more electrical cables. In some cases, as with inductive power, power can be transferred wirelessly using power transfer links 187. A power transfer link 187 can transmit power from one component (e.g., a battery, a generator) of the system 199 to another (e.g., a motor on the subsea manifold 142). Each power transfer link 187 can be sized (e.g., 12 gauge, 18 gauge, 4 gauge) in a manner suitable for the amount (e.g., 480V, 24V, 120V) and type (e.g., alternating current, direct current) of power transferred therethrough. In this case, the communication links 105 and the power transfer links 187 are in the form of electrical cables.

In many cases, the subterranean resource 111 is extracted from the subterranean formation 110 through the wellbore 120 at a relatively high temperature. In such cases, the temperature of the subterranean resource 111 needs to be lowered to within a range of acceptable values before the subterranean resource 111 can be delivered to and transported through the subsea pipeline 148. Different methods are used to extract some of the excess heat (also sometimes called waste heat herein) from the subterranean resource 111 before reaching the subsea pipeline 148.

Figure 2:
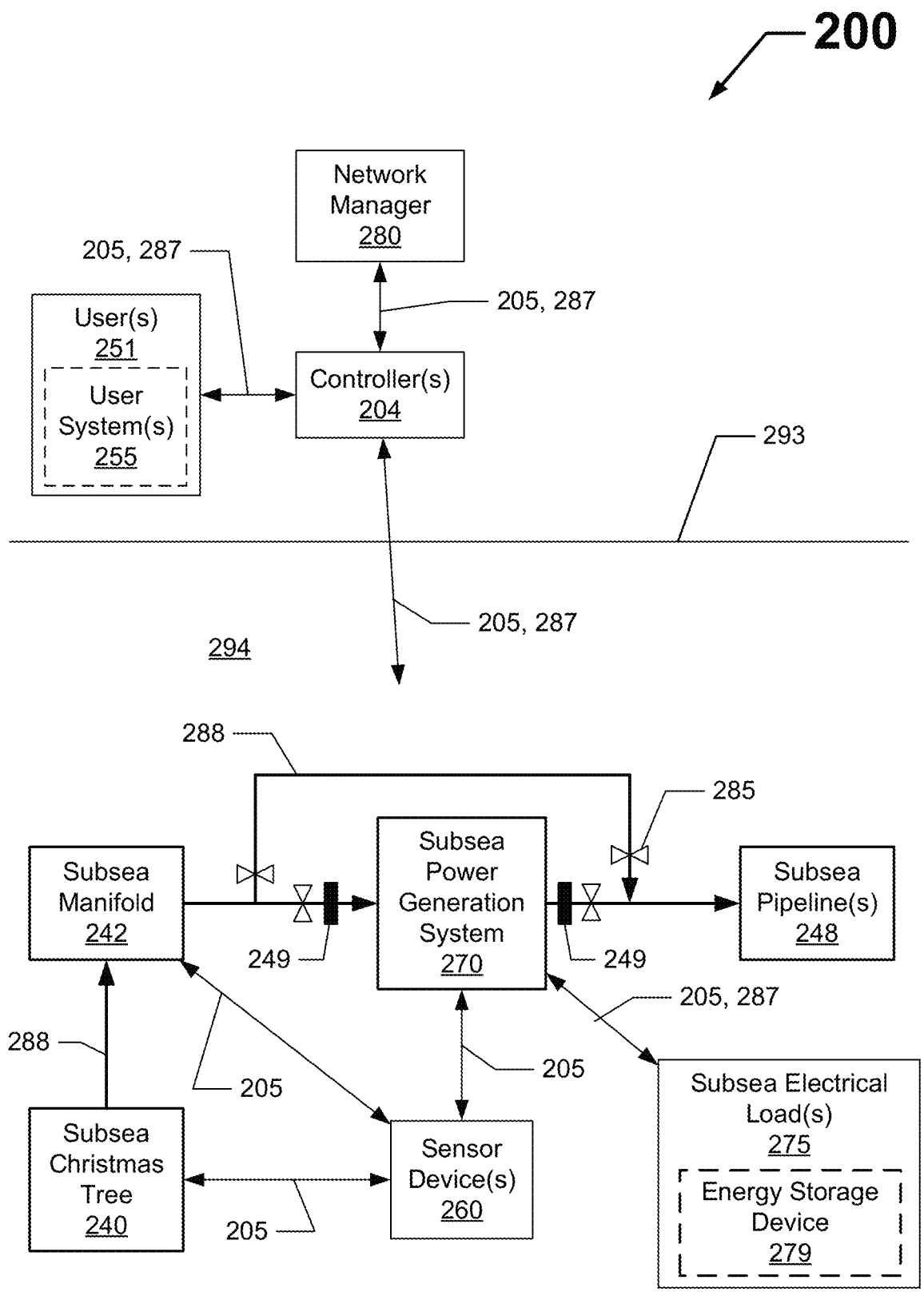
FIG. 2 shows a block diagram of a system for heat recovery and utilization from subsea field operations according to certain example embodiments.

FIG. 2 shows a block diagram of a system 200 for heat recovery and utilization from subsea field operations according to certain example embodiments. Referring to FIGS. 1 and 2, the system 200 of FIG. 2 includes a subsea Christmas tree 240, a subsea manifold 242, an example subsea power generation system 270, one or more subsea electrical loads 275, one or more subsea pipelines 248, one or more controllers 204, one or more sensor devices 260, one or more users 251 (including one or more optional user systems 255), a network manager 280, piping 288, one or more disconnects 249, and one or more valves 285. The subsea Christmas tree 240, the subsea manifold 242, the one or more subsea pipelines 248, and the piping 288 can be substantially the same as the subsea Christmas tree 140, the subsea manifold 142, the one or more subsea pipelines 148, and the piping 188 discussed above with respect to FIG. 1.

The components shown in FIG. 2 are not exhaustive, and in some embodiments, one or more of the components shown in FIG. 2 may not be included in the example system 200. Any component of the system 200 can be discrete or combined with one or more other components of the system 200. Also, one or more components of the system 200 can have different configurations. For example, one or more sensor devices 260 can be disposed above the water line 293 rather than all being submerged in the water 294. As yet another example, one or more sensor devices 260 can be used to measure one or more parameters associated with a subsea pipeline 248 and/or the subsea electrical load 275. As still another example, a controller 204, rather than being a stand-alone device, can be part of one or more other components (e.g., the subsea power generation system 270, the subsea manifold 242, the subsea Christmas tree 240) of the system 200.

In some cases, the users 251 (including the associated user systems 255), the controllers 204, and the network manager 280 can be located on the topsides (e.g., topsides 107) of a floating structure (e.g., floating structure 103) or a land-based structure (e.g., land-based structure 103). In addition, or in the alternative, one or more users 251 (including any associated user system 255), one or more controllers 204, and/or the network manager 280 can be located elsewhere (e.g., on land, in the water 294).

A user 251 can be any person that interacts, directly or indirectly, with a controller 204 and/or any other component of the system 200. Examples of a user 251 may include, but are not limited to, a business owner, an engineer, a company representative, a geologist, a consultant, a contractor, and a manufacturer's representative. A user 251 can use one or more user systems 255, which may include a display (e.g., a GUI). A user system 255 of a user 251 can interact with (e.g., send data to, obtain data from) the controller 204 via an application interface and using the communication links 205. The user 251 can also interact directly with the controller 204 through a user interface (e.g., keyboard, mouse, touchscreen).

A user system 255 of a user 251 interacts with (e.g., sends data to, receives data from) the controller 204 via an application interface (discussed below with respect to FIG. 5). Examples of a user system 255 can include, but are not limited to, a cell phone with an app, a laptop computer, a handheld device, a smart watch, a desktop computer, and an electronic tablet. In some cases, a user 251 (including an associated user system 255) can also interact with a network manager 280 and/or one or more of the sensor devices 260 in the system 200 using one or more communication links 205.

The network manager 280 is a device or component that controls all or a portion (e.g., a communication network, the controller 204) of the system 200. The network manager 280 can be substantially similar to the controller 204, discussed below. For example, the network manager 280 can include a controller that has one or more components and/or similar functionality to some or all of the controller 204. Alternatively, the network manager 280 can include one or more of a number of features in addition to, or altered from, the features of the controller 204. As described herein, control and/or communication with the network manager 280 can include communicating with one or more other components of the same system 200 or another system. In such a case, the network manager 280 can facilitate such control and/or communication. The network manager 280 can be called by other names, including but not limited to a master controller, a network controller, and an enterprise manager. The network manager 280 can be considered a type of computer device, as discussed below with respect to FIG. 6.

The system 200 can include one or more controllers 204. A controller 204 of the system 200 communicates with and in some cases controls one or more of the other components (e.g., a sensor device 260, an operator for a valve 285, the subsea power generation system 270, the subsea electrical load 275) of the system 200. A controller 204 performs a number of functions that include obtaining and sending data, evaluating data, following protocols, running algorithms, and sending commands. A controller 204 can include one or more of a number of components. As discussed below with respect to FIG. 5, such components of a controller 204 can include, but are not limited to, a control engine, a communication module, a timer, a counter, a power module, a storage repository, a hardware processor, memory, a transceiver, an application interface, and a security module. When there are multiple controllers 204 (e.g., one controller 204 for the subsea manifold 242, another controller 204 for the subsea power generation system 270, yet another controller 204 for the subsea Christmas tree 240), each controller 204 can operate independently of each other. Alternatively, one or more of the controllers 204 can work cooperatively with each other. As yet another alternative, one of the controllers 204 can control some or all of one or more other controllers 204 in the system 200. Each controller 204 can be considered a type of computer device, as discussed below with respect to FIG. 6.

Each sensor device 260 includes one or more sensors that measure one or more parameters (e.g., pressure, flow rate, temperature, humidity, fluid content, voltage, current, chemical elements in a fluid, chemical elements in a solid). Examples of a sensor of a sensor device 260 can include, but are not limited to, a temperature sensor, a flow sensor, a pressure sensor, a gas spectrometer, a voltmeter, an ammeter, a permeability meter, a porosimeter, and a camera. A sensor device 260 can be integrated with or measure a parameter associated with one or more components of the system 200. For example, a sensor device 260 can be configured to measure a parameter (e.g., flow rate, pressure, temperature) of a working fluid in a closed loop of the subsea power generation system 270.

As another example, a sensor device 260 can be configured to determine how open or closed a valve 285 within the system 200 is. In some cases, a number of sensor devices 260, each measuring a different parameter, can be used in combination to determine and confirm whether a controller 204 should take a particular action (e.g., operate a valve 285, operate or adjust the operation of the subsea power generation system 270). When a sensor device 260 includes its own controller (e.g., controller 204), or portions thereof, then the sensor device 260 can be considered a type of computer device, as discussed below with respect to FIG. 6.

The system 200 can include one or more subsea electrical loads 275. Each subsea electrical load 275 is located in the water 294 and operates using power generated by the subsea power generation system 270 and delivered using one or more power transfer links 287 and/or communication links 205. A subsea electrical load 275 can be any device or component that uses electrical power to operate. Examples of a subsea electrical load 275 can include, but are not limited to, a subsea energy storage device 279 (e.g., a battery), a motor, a sensor device 260, and an operator for a valve 285. In some cases, a subsea electrical load 275 can be part of another component (e.g., a subsea pipeline 248, the subsea manifold 242) of the system 200 located in the water 294. Alternatively, a subsea electrical load 275 can be a stand-alone device or component in the system 200 or unrelated to the system 200. In embodiments where one subsea electrical load 275 is an energy storage device 279 that receives the electrical power generated by the subsea power generation system 270 to charge the subsea energy storage device 279, where the subsea energy storage device 279 may provide power to another subsea component (e.g., another subsea electrical load 275) of the system 200.

In certain example embodiments, the subsea power generation system 270 has multiple components and/or configurations. At least some, if not all, of these components of the subsea power generation system 270 are located in the water 294. Examples of components of the subsea power generation system 270 can include, but are not limited to, a heat exchanger, a turbine, and a generator. The subsea power generation system 270 is designed to receive excess heat from the subterranean resource (e.g., similar to the subterranean resource 111 discussed above (e.g., oil, natural gas, water, hydrogen gas)) being produced in a field operation and use the excess heat to generate electrical power. The excess heat can originate from one or more of a number of processes. For example, the excess heat can be naturally-occurring in the subterranean resource 111 shortly after the subterranean resource 111 is extracted from the subterranean formation 110. As another example, the excess heat can be derived from mechanical input from the compression (e.g., as by the subsea compressor 444 of FIG. 4 below) or pumping of the subterranean resource 111. After the excess heat is recovered from the subterranean resource, the subterranean resource flows through piping 288 to one or more of the subsea pipelines 248. To the extent that a component of the subsea power generation system 270 is located in the water 294, the component can be contained within a housing that is designed for a subsea environment. Various example subsea power generation systems are discussed below in FIGS. 7 through 10.

Communication between the network manager 280, the users 251 (including any associated user systems 255), the controllers 204, the subsea Christmas tree 240, the subsea manifold 242, the subsea power generation system 270, the sensor devices 260, the subsea pipelines 248, the subsea electrical loads 275, and any other components of the system 200 can be facilitated using the communication links 205, which are substantially the same as the communication links 105 discussed above with respect to FIG. 1. Similarly, the transfer of power between any two components (e.g., the subsea power generation system 270 and a subsea electrical load 275, a power generator on the topsides (e.g., topsides 107) of a floating structure (e.g., floating structure 103) or a land-based structure (e.g., land-based structure 103) and a controller 204) can be facilitated using power transfer links 287, which are substantially the same as the power transfer links 187 discussed above with respect to FIG. 1.

In certain example embodiments, the subsea power generation system 270 can be isolated from the rest of the system 200 and/or bypassed while a field operation (or stage thereof) remains ongoing, without being interrupted. In such a case, one or more valves 285 can be integrated with the piping 288 leading to, leading from, and/or bypassing the subsea power generation system 270 in order to accomplish these adjustments to the utilization of the subsea power generation system 270 in real time. Each of these valves 288 can be operated manually or remotely (e.g., using a controller 204).

In addition, or in the alternative, the subsea power generation system 270 can be inserted into and/or removed from the piping 288 in the system 200 using one or more disconnects 249. Each disconnect 249 is designed to allow for the associated piping 288 to be sealed (closed) when the subsea power generation system 270 is removed from the system 200 and open when the subsea power generation system 270 is connected to the system 200. A disconnect 249 can be operated manually or remotely (e.g., using a controller 204). Such disconnects 249 can be used in conjunction with, or independently of, one or more of the valves 285.

A valve 285 can have one or more of any of a number of configurations, including but not limited to a guillotine valve, a check valve, a ball valve, a gate valve, a butterfly valve, a pinch valve, a needle valve, a plug valve, a diaphragm valve, and a globe valve. One valve 285 can be configured the same as or differently compared to another valve 285 in the system 200. If a valve 285 is controllable, that valve 285 can be controlled by a user 251, a controller 204, or some other component of the system 200. When there are multiple valves 285 in the system 200 that are controllable, one valve 285 can be controlled (e.g., manually by a user 251, automatically by a controller 204) the same or differently compared to how another valve 285 in the system 200 is controlled.

Figure 3:
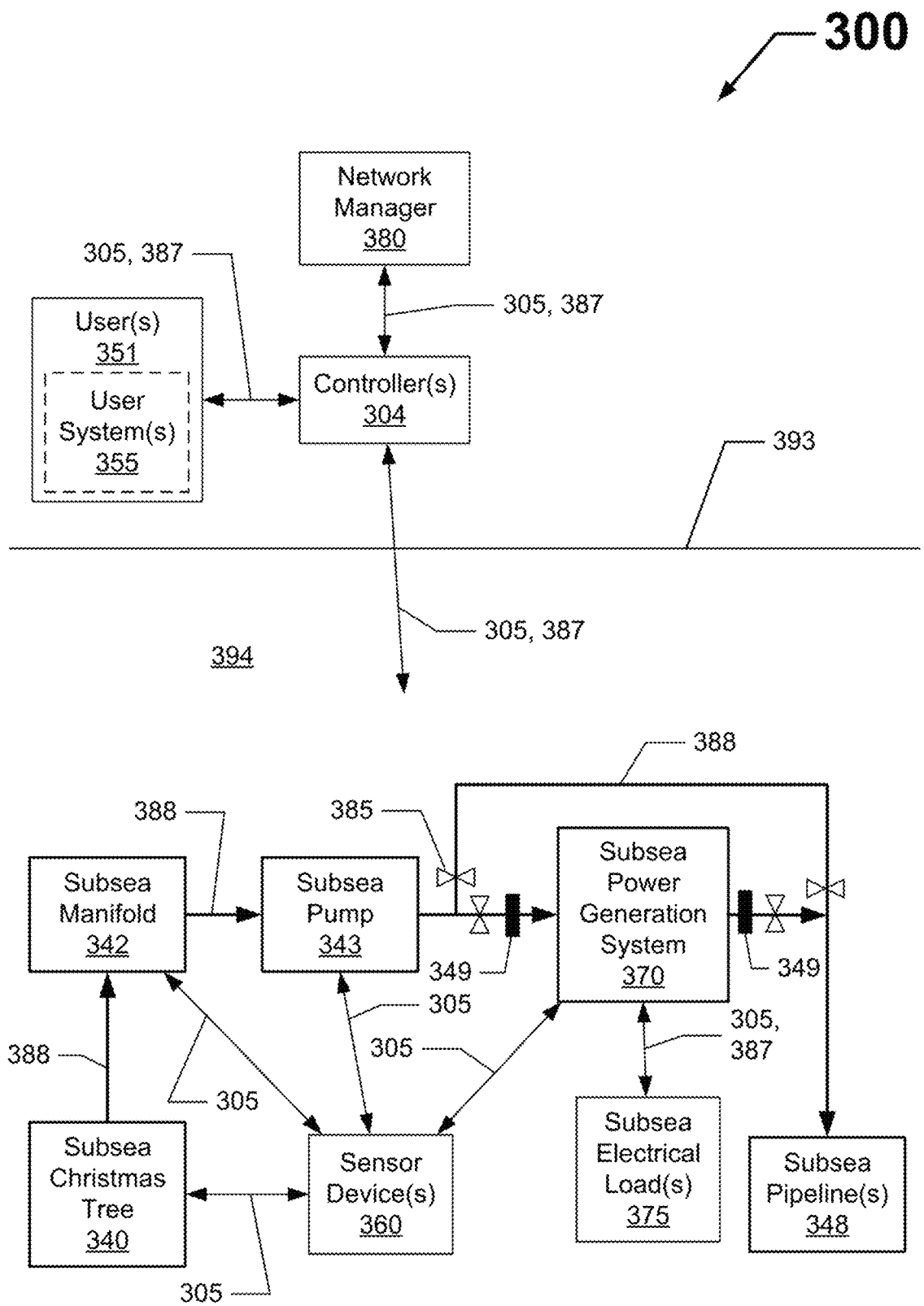
FIG. 3 shows a block diagram of another system for heat recovery and utilization from subsea field operations according to certain example embodiments.

FIG. 3 shows a block diagram of another system 300 for heat recovery and utilization from subsea field operations according to certain example embodiments. Referring to FIGS. 1 through 3, the system 300 of FIG. 3 includes a subsea pump 343, a subsea Christmas tree 340, a subsea manifold 342, an example subsea power generation system 370, one or more subsea electrical loads 375, one or more subsea pipelines 348, one or more controllers 304, one or more sensor devices 360, one or more users 351 (including one or more optional user systems 355), a network manager 380, piping 388, one or more disconnects 349, communication links 305, power transfer links 387, and one or more valves 385. The subsea Christmas tree 340, the subsea manifold 342, the example subsea power generation system 370, the one or more subsea electrical loads 375, the one or more subsea pipelines 348, the one or more controllers 304, the one or more sensor devices 360, the one or more users 351 (including the one or more optional user systems 355), the network manager 380, the piping 388, the one or more disconnects 349, the communication links 305, the power transfer links 387, and the one or more valves 385 can be substantially the same as the corresponding components discussed above with respect to FIGS. 1 and 2. At least the subsea Christmas tree 340, the subsea manifold 342, the example subsea power generation system 370, the one or more subsea electrical loads 375, the one or more subsea pipelines 348, the one or more sensor devices 360, the piping 388, the one or more disconnects 349, at least some of the communication links 305, at least some of the power transfer links 387, and the one or more valves 385 are located in the water 394 (below the water line 393).

The system 300 of FIG. 3 is substantially the same as the system 200 of FIG. 2, except that the system 300 of FIG. 3 includes the subsea pump 343 positioned between the subsea manifold 342 and the subsea power generation system 370 (or the subsea pipelines 348 if the subsea power generation system 370 is bypassed (e.g., using the valves 385) or disconnected (e.g., using the disconnects 349)). The subsea pump 343 is configured to pump the subterranean resource (e.g., similar to the subterranean resource 111 discussed above (e.g., oil, natural gas, water, hydrogen gas)) through the piping 388 to the subsea power generation system 370 (or the subsea pipelines 348 if the subsea power generation system 370 is bypassed or disconnected).

Figure 4:
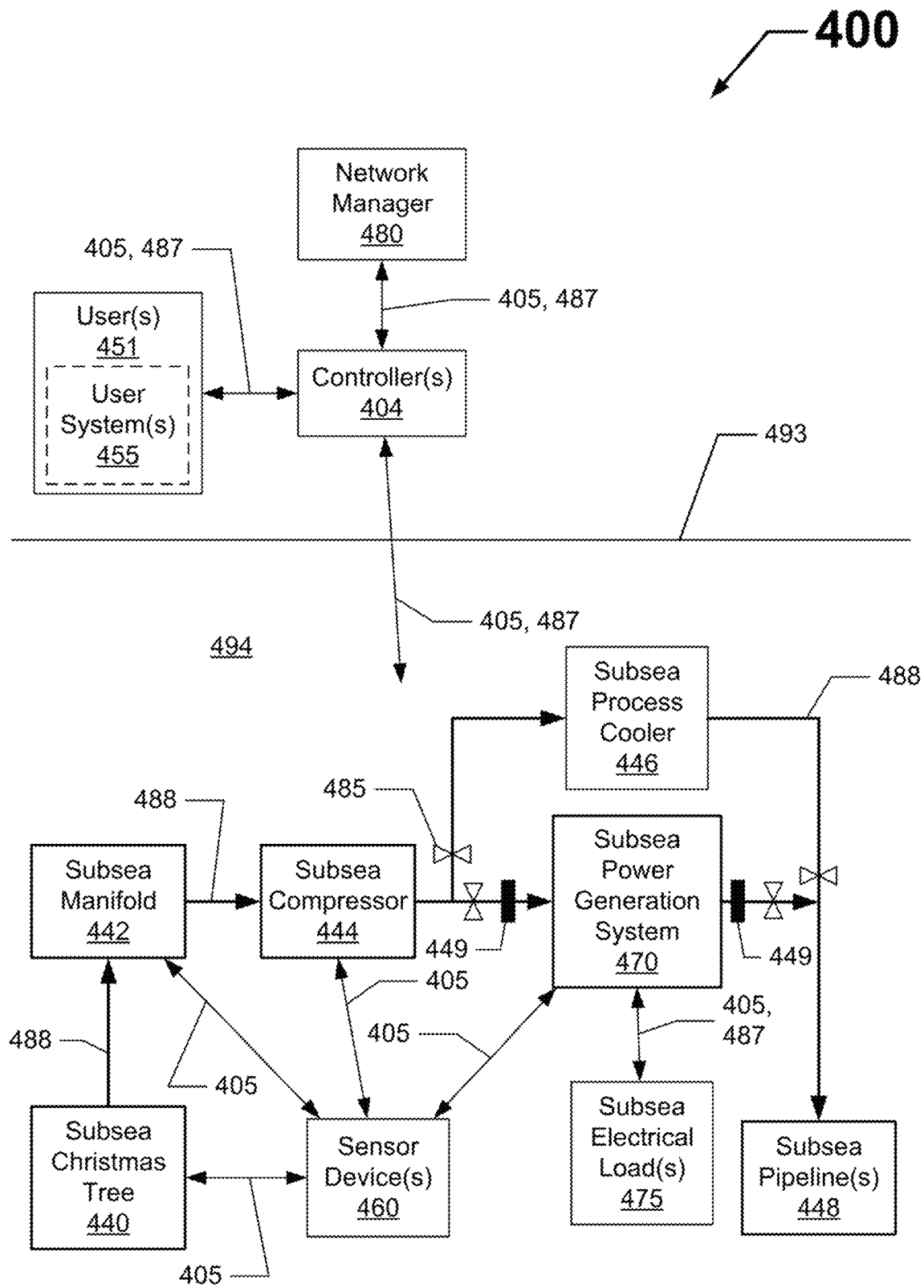
FIG. 4 shows a block diagram of yet another system for heat recovery and utilization from subsea field operations according to certain example embodiments.

FIG. 4 shows a block diagram of another system 400 for heat recovery and utilization from subsea field operations according to certain example embodiments. Referring to FIGS. 1 through 4, the system 400 of FIG. 4 includes a subsea compressor 444, a subsea process cooler 446, a subsea Christmas tree 440, a subsea manifold 442, an example subsea power generation system 470, one or more subsea electrical loads 475, one or more subsea pipelines 448, one or more controllers 404, one or more sensor devices 460, one or more users 451 (including one or more optional user systems 455), a network manager 480, piping 488, one or more disconnects 449, communication links 405, power transfer links 487, and one or more valves 485. The subsea Christmas tree 440, the subsea manifold 442, the example subsea power generation system 470, the one or more subsea electrical loads 475, the one or more subsea pipelines 448, the one or more controllers 404, the one or more sensor devices 460, the one or more users 451 (including the one or more optional user systems 455), the network manager 480, the piping 488, the one or more disconnects 449, the communication links 405, the power transfer links 487, and the one or more valves 485 can be substantially the same as the corresponding components discussed above with respect to FIGS. 1 through 3. At least the subsea Christmas tree 440, the subsea manifold 442, the example subsea power generation system 470, the one or more subsea electrical loads 475, the one or more subsea pipelines 448, the one or more sensor devices 460, the piping 488, the one or more disconnects 449, at least some of the communication links 405, at least some of the power transfer links 487, and the one or more valves 485 are located in the water 494 (below the water line 493).

The system 400 of FIG. 4 is substantially the same as the system 200 of FIG. 2, except that the system 300 of FIG. 3 includes the subsea compressor 444 positioned between the subsea manifold 442 and the subsea power generation system 470. Also, the subsea process cooler 446 is placed in the piping 488 that bypasses the subsea power generation system 470 between the subsea compressor 444 and the subsea pipelines 448. The subsea compressor 444 is configured to compress the subterranean resource (e.g., similar to the subterranean resource 111 discussed above (e.g., oil, natural gas, water, hydrogen gas)) before the subterranean resource reaches the subsea power generation system 470 (or the subsea process cooler 446 if the subsea power generation system 470 is bypassed or disconnected). Compressing the subterranean resource causes the temperature of the subterranean resource to rise.

The subsea process cooler 446 is configured to bypass and reject excess heat from the subterranean resource before the subterranean resource reaches the pipelines 448. In this case, the subsea power generation system 470 receives this excess heat (also called waste heat herein) rejected by the subsea process cooler 446 to generate electrical power. Depending on outlet temperature requirements of the subterranean resource, flow through the subsea process cooler 446 can modulate the delivery temperature of the subterranean resource to the subsea pipelines 448. In some cases, the piping 488 leading to and trailing from the subsea process cooler 446 can have one or more valves 485 and/or one or more disconnects 449 disposed therein to allow the subsea process cooler 446 to be bypassed and/or disconnected from the system 400. In such a case, additional piping 488 can be added to what is shown in FIG. 4 to bypass both the subsea power generation system 470 and the subsea process cooler 446.

Figure 5:
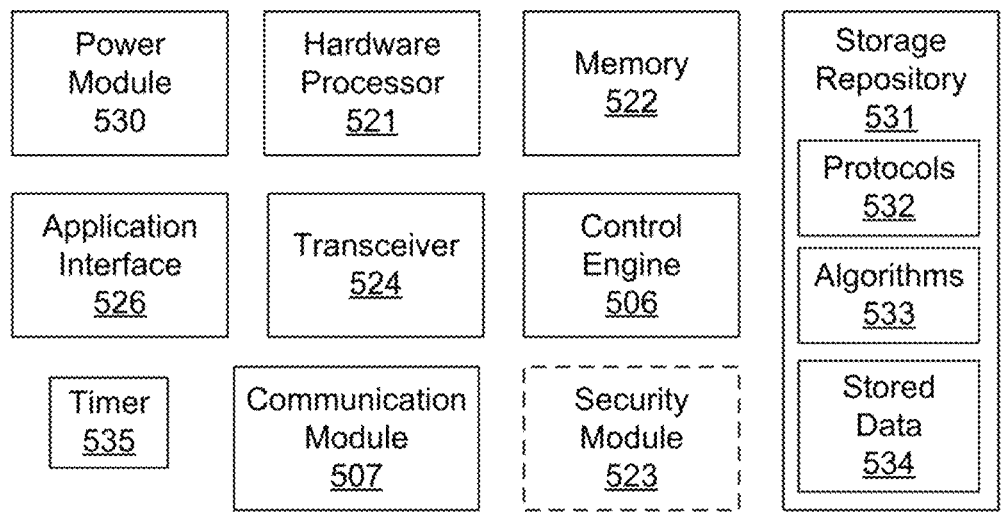
FIG. 5 shows a block diagram of a controller of the system of FIG. 4.

FIG. 5 shows a system diagram of a controller 404 of the system 400 of FIG. 4. Referring to FIGS. 1 through 5, the controller 404 of FIG. 5 can be substantially the same as a controller 204 or a controller 304 discussed above with respect to the system 200 of FIG. 2 and the system 300 of FIG. 3, respectively. The controller 404 includes multiple components. In this case, the controller 404 of FIG. 5 includes a control engine 506, a communication module 507, a timer 535, a power module 530, a storage repository 531, a hardware processor 521, a memory 522, a transceiver 524, an application interface 526, and, optionally, a security module 523. The controller 404 (or components thereof) can be located at or near the various components of the system 400. In addition, or in the alternative, the controller 404 (or components thereof) can be located remotely from (e.g., in the cloud, at an office building) the various components of a system.

The storage repository 531 can be a persistent storage device (or set of devices) that stores software and data used to assist the controller 404 in communicating with one or more other components of a system, such as the users 451 (including associated user systems 455), the subsea Christmas tree 440, the subsea manifold 442, the subsea compressor 444, the subsea power generation system 470, the subsea process cooler 446, the subsea electrical loads 475, the subsea pipelines 448, the network manager 480, and the sensor devices 460 of the system 400 of FIG. 4. In one or more example embodiments, the storage repository 531 stores one or more protocols 532, algorithms 533, and stored data 534.

The protocols 532 of the storage repository 531 can be any procedures (e.g., a series of method steps) and/or other similar operational processes that the control engine 506 of the controller 404 follows based on certain conditions at a point in time. The protocols 532 can include any of a number of communication protocols that are used to send and/or obtain data between the controller 404 and other components of the system 400. Such protocols 532 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 532 can provide a layer of security to the data transferred within the system 400. Other protocols 532 used for communication can be associated with the use of Wi-Fi, Zigbee, visible light communication (VLC), cellular networking, BLE, UWB, and Bluetooth.

The algorithms 533 can be any formulas, mathematical models, forecasts, simulations, and/or other similar tools that the control engine 506 of the controller 404 uses to reach a computational conclusion. For example, one or more algorithms 533 can be used, in conjunction with one or more protocols 532, to assist the controller 404 to determine when to start, adjust, and/or stop the operation of the subsea power generation system 470 (or portion thereof) and/or any other subsea component (or portion thereof) of the system 400. As another example, one or more algorithms 533 can be used, in conjunction with one or more protocols 532, to assist the controller 404 to receive measurements made by one or more sensor devices 460 and use those measurements to assess the system 400 (or components thereof) in real time.

Stored data 534 can be any data associated with a field (e.g., the subterranean formation 110, the subterranean resource 111, the wellbore 120), other fields (e.g., other wellbores and subterranean formations), the other components (e.g., the user systems 455, the subsea manifold 442, the subsea electrical loads 475, the subsea power generation system 470), including associated equipment (e.g., motors, pumps, compressors), of the system 400, measurements made by the sensor devices 460, threshold values, tables, results of previously run or calculated algorithms 533, updates to protocols 532, user preferences, and/or any other suitable data. Such data can be any type of data, including but not limited to historical data, present data, and future data (e.g., forecasts). The stored data 534 can be associated with some measurement of time derived, for example, from the timer 535.

Examples of a storage repository 531 can include, but are not limited to, a database (or a number of databases), a file system, cloud-based storage, a hard drive, flash memory, some other form of solid-state data storage, or any suitable combination thereof. The storage repository 531 can be located on multiple physical machines, each storing all or a portion of the communication protocols 532, the algorithms 533, and/or the stored data 534 according to some example embodiments. Each storage unit or device can be physically located in the same or in a different geographic location.

The storage repository 531 can be operatively connected to the control engine 506. In one or more example embodiments, the control engine 506 includes functionality to communicate with the users 451 (including associated user systems 455), the sensor devices 460, the network manager 480, and the other components in the system 400. More specifically, the control engine 506 sends information to and/or obtains information from the storage repository 531 in order to communicate with the users 451 (including associated user systems 455), the sensor devices 460, the network manager 480, and the other components of the system 400. As discussed below, the storage repository 531 can also be operatively connected to the communication module 507 in certain example embodiments.

In certain example embodiments, the control engine 506 of the controller 404 controls the operation of one or more components (e.g., the communication module 507, the timer 535, the transceiver 524) of the controller 404. For example, the control engine 506 can activate the communication module 507 when the communication module 507 is in "sleep" mode and when the communication module 507 is needed to send data obtained from another component (e.g., a sensor device 460) in the system 400. In addition, the control engine 506 of the controller 404 can control the operation of one or more other components (e.g., the subsea power generation system 470, the subsea manifold 442, an electrical load 475), or portions thereof, of the system 400.

The control engine 506 of the controller 404 can communicate with one or more other components of the system 400. For example, the control engine 506 can use one or more protocols 532 to facilitate communication with the sensor devices 460 to obtain data (e.g., measurements of various parameters, such as temperature, pressure, and flow rate), whether in real time or on a periodic basis and/or to instruct a sensor device 460 to take a measurement. The control engine 506 can use measurements of parameters taken by sensor devices 460 during a stage of a field operation, as well as one or more protocols 532 and/or algorithms 533, to determine whether the operation of the subsea power generation system 470 (or portion thereof) and/or any other subsea component (or portion thereof) of the system 400 needs to be started, stopped, or adjusted. Such a determination can be made in real time or on a periodic (e.g., every 30 seconds) basis.

The control engine 506 can generate and process data associated with control, communication, and/or other signals sent to and obtained from the users 451 (including associated user systems 455), the sensor devices 460, the network manager 480, and the other components of the system 400. In certain embodiments, the control engine 506 of the controller 404 can communicate with one or more components of a system external to the system 400. For example, the control engine 506 can interact with an inventory management system by ordering replacements for components or pieces of equipment (e.g., a sensor device 460, a valve 485, a motor) within the system 400 that has failed or is failing. As another example, the control engine 506 can interact with a contractor or workforce scheduling system by arranging for the labor needed to replace a component or piece of equipment in the system 400. In this way and in other ways, the controller 404 is capable of performing a number of functions beyond what could reasonably be considered a routine task.

In certain example embodiments, the control engine 506 can include an interface that enables the control engine 506 to communicate with the sensor devices 460, the user systems 455, the network manager 480, and the other components of the system 400. For example, if a user system 455 operates under IEC Standard 62386, then the user system 455 can have a serial communication interface that will transfer data to the controller 404. Such an interface can operate in conjunction with, or independently of, the protocols 532 used to communicate between the controller 404 and the users 451 (including corresponding user systems 455), the sensor devices 460, the network manager 480, and the other components of the system 400.

The control engine 506 (or other components of the controller 404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 507 of the controller 404 determines and implements the communication protocol (e.g., from the protocols 532 of the storage repository 531) that is used when the control engine 506 communicates with (e.g., sends signals to, obtains signals from) the user systems 455, the sensor devices 460, the network manager 480, and the other components of the system 400. In some cases, the communication module 507 accesses the stored data 534 to determine which communication protocol is used to communicate with another component of the system 400. In addition, the communication module 507 can identify and/or interpret the communication protocol of a communication obtained by the controller 404 so that the control engine 506 can interpret the communication. The communication module 507 can also provide one or more of a number of other services with respect to data sent from and obtained by the controller 404. Such services can include, but are not limited to, data packet routing information and procedures to follow in the event of data interruption.

The timer 535 of the controller 404 can track clock time, intervals of time, an amount of time, and/or any other measure of time. The timer 535 can also count the number of occurrences of an event, whether with or without respect to time. Alternatively, the control engine 506 can perform a counting function. The timer 535 is able to track multiple time measurements and/or count multiple occurrences concurrently. The timer 535 can track time periods based on an instruction obtained from the control engine 506, based on an instruction obtained from a user 451, based on an instruction programmed in the software for the controller 404, based on some other condition (e.g., the occurrence of an event) or from some other component, or from any combination thereof. In certain example embodiments, the timer 535 can provide a time stamp for each packet of data obtained from another component (e.g., a sensor device 460) of the system 400.

The power module 530 of the controller 404 obtains power from a power supply (e.g., AC mains) and manipulates (e.g., transforms, rectifies, inverts) that power to provide the manipulated power to one or more other components (e.g., the timer 535, the control engine 506) of the controller 404, where the manipulated power is of a type (e.g., alternating current, direct current) and level (e.g., 12V, 24V, 120V) that can be used by the other components of the controller 404. In some cases, the power module 530 can also provide power to one or more of the sensor devices 460.

The power module 530 can include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 can be a source of power in itself to provide signals to the other components of the controller 404. For example, the power module 530 can be or include an energy storage device (e.g., a battery). As another example, the power module 530 can be or include a localized photovoltaic power system.

The hardware processor 521 of the controller 404 executes software, algorithms (e.g., algorithms 533), and firmware in accordance with one or more example embodiments. Specifically, the hardware processor 521 can execute software on the control engine 506 or any other portion of the controller 404, as well as software used by the users 451 (including associated user systems 455), the network manager 480, and/or other components of the system 400. The hardware processor 521 can be an integrated circuit, a central processing unit, a multi-core processing chip, SoC, a multi-chip module including multiple multi-core processing chips, or other hardware processor in one or more example embodiments. The hardware processor 521 can be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 can include volatile and/or non-volatile memory. The memory 522 can be discretely located within the controller 404 relative to the hardware processor 521. In certain configurations, the memory 522 can be integrated with the hardware processor 521.

In certain example embodiments, the controller 404 does not include a hardware processor 521. In such a case, the controller 404 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices can be used in conjunction with one or more hardware processors 521.

The transceiver 524 of the controller 404 can send and/or obtain control and/or communication signals. Specifically, the transceiver 524 can be used to transfer data between the controller 404 and the users 451 (including associated user systems 455), the sensor devices 460, the network manager 480, and the other components of the system 400. The transceiver 524 can use wired and/or wireless technology. The transceiver 524 can be configured in such a way that the control and/or communication signals sent and/or obtained by the transceiver 524 can be obtained and/or sent by another transceiver that is part of a user system 455, a sensor device 460, the network manager 480, and/or another component of the system 400. The transceiver 524 can send and/or obtain any of a number of signal types, including but not limited to radio frequency signals and sound waves.

When the transceiver 524 uses wireless technology, any type of wireless technology can be used by the transceiver 524 in sending and obtaining signals. Such wireless technology can include, but is not limited to, Wi-Fi, Zigbee, VLC, cellular networking, BLE, UWB, and Bluetooth. The transceiver 524 can use one or more of any number of suitable communication protocols (e.g., ISA100, HART) when sending and/or obtaining signals.

Optionally, in one or more example embodiments, the security module 523 secures interactions between the controller 404, the users 451 (including associated user systems 455), the sensor devices 460, the network manager 480, and the other components of the system 400. More specifically, the security module 523 authenticates communication from software based on security keys verifying the identity of the source of the communication. For example, user software may be associated with a security key enabling the software of a user system 455 to interact with the controller 404. Further, the security module 523 can restrict receipt of information, requests for information, and/or access to information.

A user 451 (including an associated user system 455), the sensor devices 460, the network manager 480, and the other components of the system 400 can interact with the controller 404 using the application interface 526. Specifically, the application interface 526 of the controller 404 obtains data (e.g., information, communications, instructions, updates to firmware) from and sends data (e.g., information, communications, instructions) to the user systems 455 of the users 451, the sensor devices 460, the network manager 480, and/or the other components of the system 400. Examples of an application interface 526 can be or include, but are not limited to, an application programming interface, a web service, a data protocol adapter, some other hardware and/or software, or any suitable combination thereof. Similarly, the user systems 455 of the users 451, the sensor devices 460, the network manager 480, and/or the other components of the system 400 can include an interface (similar to the application interface 526 of the controller 404) to obtain data from and send data to the controller 404 in certain example embodiments.

In addition, as discussed above with respect to a user system 455 of a user 451, one or more of the sensor devices 460, the network manager 480, and/or one or more of the other components of the system 400 can include a user interface. Examples of such a user interface can include, but are not limited to, a graphical user interface, a touchscreen, a keyboard, a monitor, a mouse, some other hardware, or any suitable combination thereof.

The controller 404, the users 451 (including associated user systems 455), the sensor devices 460, the network manager 480, and the other components of the system 400 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 404. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 6.

Further, as discussed above, such a system can have corresponding software (e.g., user system software, sensor device software, controller software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 400.

Figure 6:
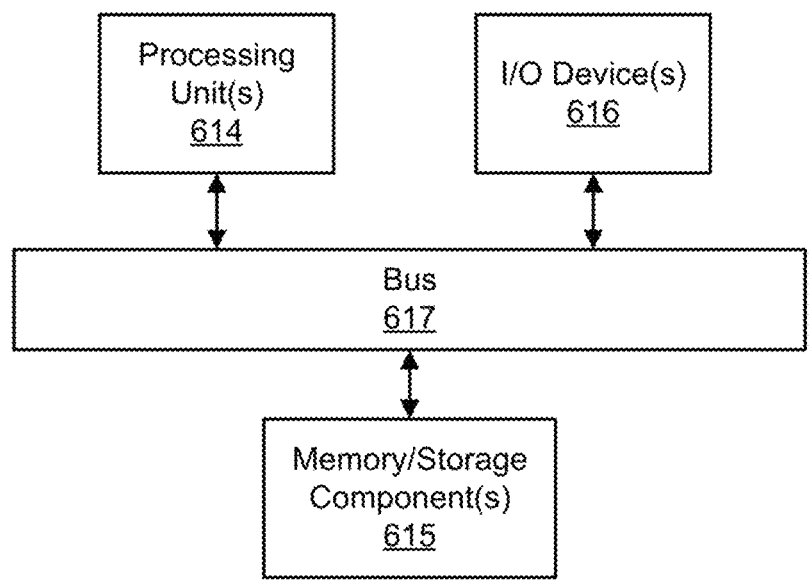
FIG. 6 shows a diagram of a computing system according to certain example embodiments.

FIG. 6 illustrates one embodiment of a computing device 618 that implements one or more of the various techniques described herein, and which is representative, in whole or in part, of the elements described herein pursuant to certain example embodiments. For example, a controller 404 (including components thereof, such as a control engine 506, a hardware processor 520, a storage repository 531, a power module 530, and a transceiver 524) can be considered a computing device 618. Computing device 618 is one example of a computing device and is not intended to suggest any limitation as to scope of use or functionality of the computing device and/or its possible architectures. Neither should the computing device 618 be interpreted as having any dependency or requirement relating to any one or combination of components illustrated in the example computing device 618.

The computing device 618 includes one or more processors or processing units 614, one or more memory/storage components 615, one or more input/output (I/O) devices 616, and a bus 617 that allows the various components and devices to communicate with one another. The bus 617 represents one or more of any of several types of bus structures, including a memory bus or memory controller, a peripheral bus, an accelerated graphics port, and a processor or local bus using any of a variety of bus architectures. The bus 617 includes wired and/or wireless buses.

The memory/storage component 615 represents one or more computer storage media. The memory/storage component 615 includes volatile media (such as random access memory (RAM)) and/or nonvolatile media (such as read only memory (ROM), flash memory, optical disks, magnetic disks, and so forth). The memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a user (e.g., user 251, user 351, user 451) to enter commands and information to the computing device 618, and also allow information to be presented to the user (e.g., user 251, user 351, user 451) and/or other components or devices. Examples of input devices 616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments. Further, one or more embodiments is implemented on a distributed system having one or more nodes, where each portion of the implementation (e.g., the subsea power generation system 470, the subsea manifold 342) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 7:
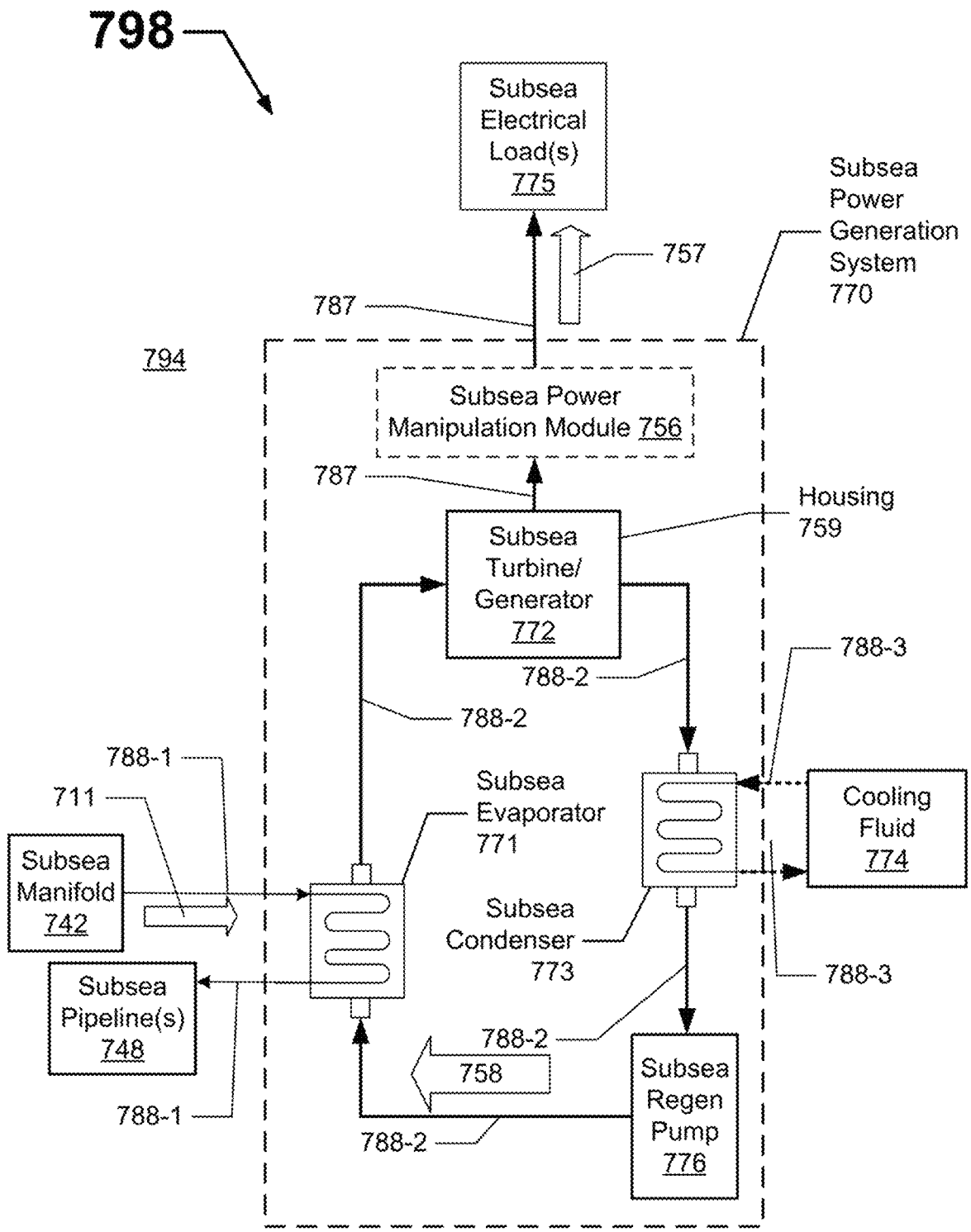
FIG. 7 shows a block diagram of a subsystem based on the configuration of the system of FIG. 2 for heat recovery and utilization from subsea field operations according to certain example embodiments.

FIG. 7 shows a block diagram of a subsystem 798 based on the configuration of the system 200 of FIG. 2 for heat recovery and utilization from subsea field operations according to certain example embodiments. Referring to FIGS. 1 through 7, the subsystem 798 includes a subsea manifold 742, one or more subsea pipelines 748, one or more subsea electrical loads 775, cooling fluid 774, and a subsea power generation system 770, all of which are located in water 794. The subsea manifold 742, the subsea pipelines 748, the subsea electrical loads 775, the piping 788 (e.g., piping 788-1, piping 788-2, piping 788-3), and the subsea power generation system 770 can be substantially the same as the subsea manifold 242, the subsea pipelines 248, the subsea electrical loads 275, the piping 288, and the subsea power generation system 270 discussed above with respect to FIG. 2.

As discussed above, example subsea power generation systems discussed herein can have any of a number of components and/or configurations. In this case, the subsea power generation system 770 includes a subsea evaporator 771, a subsea turbine/generator 772, a subsea condenser 773, a subsea regen pump 776, and an optional subsea power manipulation module 756. The subsea evaporator 771, the subsea turbine/generator 772, the subsea condenser 773, and the subsea regen pump 776 are connected to each other in a closed loop using piping 778-2 and through which a working fluid 758 (e.g., propane, ammonia, R134a refrigerant, other fluids that have similar thermodynamic critical properties as propane, ammonia, and R134a refrigerant, other fluids that have similar thermodynamic critical properties relative to a heat source (e.g., the excess heat transferred from the subterranean resource 711 in the subsea evaporator 771) and a heat sink (e.g., the cooling fluid 774 in the subsea condenser 773) within the closed loop system, etc.) flows.

The working fluid 758 in the closed loop of the subsea power generation system 770 can generally be described as a fluid that can exist at both an evaporated state and a condensed state at varying pressures for the range of temperatures that exist for the subterranean resource 711 and that exist for the subsea cooling part or portion (e.g., one or more of the components of the subsea power generation system 770).

The process utilized by the subsea power generation system 770 of FIG. 7 can begin with a subterranean resource 711 flowing from the subsea manifold 742 through piping 788-1 that is one part of the subsea evaporator 771. The subterranean resource 711 has excess heat when flowing out of the subsea manifold 742, and this excess heat can be transferred from the subterranean resource 711 within the subsea evaporator 771 to the working fluid 758, which is flowing through piping 788-2 that is another part of the subsea evaporator 771. The subterranean resource 711, after flowing through the first part of the subsea evaporator 771 and having cooled (e.g., from 140° F. to 70° F.) from the loss of at least some of the excess heat, flows through more piping 788-1 to one or more of the subsea pipelines 748.

The working fluid 758, heated (e.g., from 55° F. to 124° F.) from the excess heat within the second part of the subsea evaporator 771, exits the subsea evaporator 771 through more piping 788-2 and flows to the subsea turbine/generator 772. The subsea evaporator 771 can have any of a number of specifications. For example, the subsea evaporator 771 can have a nameplate duty cycle of 19.32 MMBtu/hr, a nameplate tube inlet temperature of 55.0° F., a nameplate tube outlet temperature of 123.6° F., a nameplate shell inlet temperature of 140.0° F., a nameplate shell outlet temperature of 69.8° F.

When the working fluid 758 enters the subsea turbine/generator 772, the heated working fluid 758 enables the turbine to cause the generator to rotate at a sufficient rate to generate electrical power 757, which flows to one or more of the subsea electrical loads 775 through one or more power transfer links 787. In some cases, as when the subsea electrical load 775 uses power that is a different type (e.g., alternating current, direct current) and/or level (e.g., 12V, 24V, 120V) of power compared to what is output by the generator of the subsea turbine/generator 772, the subsea power generator system 770 can include the subsea power manipulation module 756.

The subsea power manipulation module 756 can include one or more components that manipulate the power output by the generator of the subsea turbine/generator 772 into a format useable by the subsea electrical load 775. Examples of such components of the subsea power manipulation module 756 can include, but are not limited to, an inverter, a converter, a transformer, an inductor, and a rectifier. In some cases, the subsea power manipulation module 756 (or a controller (e.g., controller 204) thereof) can control the flow of the work fluid 758 into the inlet of the subsea turbine/generator 772 (or portion thereof, such as a turbo-expander) via one or more valves (e.g., valve 285).

The turbine of the subsea turbine/generator 772 can have any of a number of specifications. For example, the turbine of the subsea turbine/generator 772 can have a nameplate feed pressure of 300 psia, a nameplate product pressure of 100 psia, a nameplate feed temperature of 123.6° F., a nameplate product temperature of 56.57° F., a nameplate mass flow rate of 354,400 lb/hr, a nameplate energy rate of 0.1786 MMBtu/hr, and a nameplate power output of 7019 hp. The subsea turbine/generator 772 can have a housing 759 that is rated for use in the environment (e.g., pressure, temperature) in the water 794 where the subsea turbine/generator 772 is located. The housing 759 of the subsea turbine/generator 772 also can allow for various penetrations (e.g., the piping 788-2, the power transfer links 787) therethrough without affecting the operation of the turbine and the generator.

The housing 759 of the subsea turbine/generator 772 can be pressurized in any of a number of ways to keep the water 794 from breaching the housing 759 and entering the interior of subsea turbine/generator 772. For example, the housing 759 can be pressure retaining to keep the high-pressure water 794 out of the housing 759. As another example, the housing 759 can be pressure compensated, where the housing 759 is filled with some fluid (e.g., oil) and uses one or more mechanisms (e.g., bellow springs, bladders) to equalize the subsea pressure within the housing 759 using pressure compensation. In such cases, the subsea turbine/generator 772 or another part of the subsea power generation system 770 can use a controller 204, a sensor device 260, a valve 285, and/or any other devices to keep the housing 759 properly pressurized in the water 794.

When the working fluid 758 exits the turbine of the subsea turbine/generator 772, the working fluid 758 has cooled (e.g., from 124° F. to 57° F.) and flows through additional piping 788-2 to the subsea condenser 773. The subsea condenser 773 can slightly cool (e.g., from 56.57° F. to 53.84° F.) and depressurize (e.g., from 100 psia to 95 psia) the working fluid 758 using a cooling fluid 774 that flows through a separate part compared to the part through which the working fluid 758 flows and that has a temperature that is lower than the temperature of the working fluid 758 entering the subsea condenser 773. In some cases, the cooling fluid 774 can flow through piping 788-3 that runs through the separate part in the subsea condenser 773. Alternatively, the cooling fluid 774 can be water 794 in the subsea that constantly surrounds the part of the subsea condenser 773 through which the working fluid 758 flows.

From the subsea condenser 773, the working fluid 758 flows through additional piping 788-2 to the subsea regen pump 776, which forces the working fluid 758 to circulate through the closed loop of the piping 788-2. Specifically, the subsea regen pump 776 can dramatically increase the pressure (e.g., from 95 psia to 329 psia) of the working fluid 758 flowing through the piping 788-2 toward the subsea evaporator 771. The subsea regen pump 776 can have any of a number of specifications. For example, the subsea regen pump 776 can have a nameplate delta pressure of 234 psi, a nameplate power rating of 261.3 hp, a nameplate feed pressure of 95.0 psia, a nameplate product pressure of 329.0 psia, and a nameplate molar flow rate of 20,810 lbmole/hr. In some cases, the subsea regen pump 776 can be a subsea electrical load 775 that receives electrical power 757 from the subsea turbine/generator 772.

The working fluid 758 can be any of a number of types of fluid having any of a number of characteristics. For example, if the working fluid 758 is R134a refrigerant, the working fluid can have a gas flow of 1776 mmscf/d, a high produced gas temperature of 60° C., and a low produced gas temperature of 21° C. This can cause the generator of the subsea turbine/generator 772 to have an evaporator duty of 56.6 MW, power output of 5.6 MW, and an efficiency of 10%. As another example, if the working fluid 758 is propane, the working fluid can have a gas flow of 1776 mmscf/d, a high produced gas temperature of 60° C., and a low produced gas temperature of 21° C. This can cause the generator of the subsea turbine/generator 772 to have an evaporator duty of 56.6 MW, power output of 3.0 MW, and an efficiency of 5%. As yet another example, if the working fluid 758 is ammonia, the working fluid can have a gas flow of 1776 mmscf/d, a high produced gas temperature of 60° C., and a low produced gas temperature of 21° C. This can cause the generator of the subsea turbine/generator 772 to have an evaporator duty of 56.6 MW, power output of 5.0 MW, and an efficiency of 9%.

Figure 8:
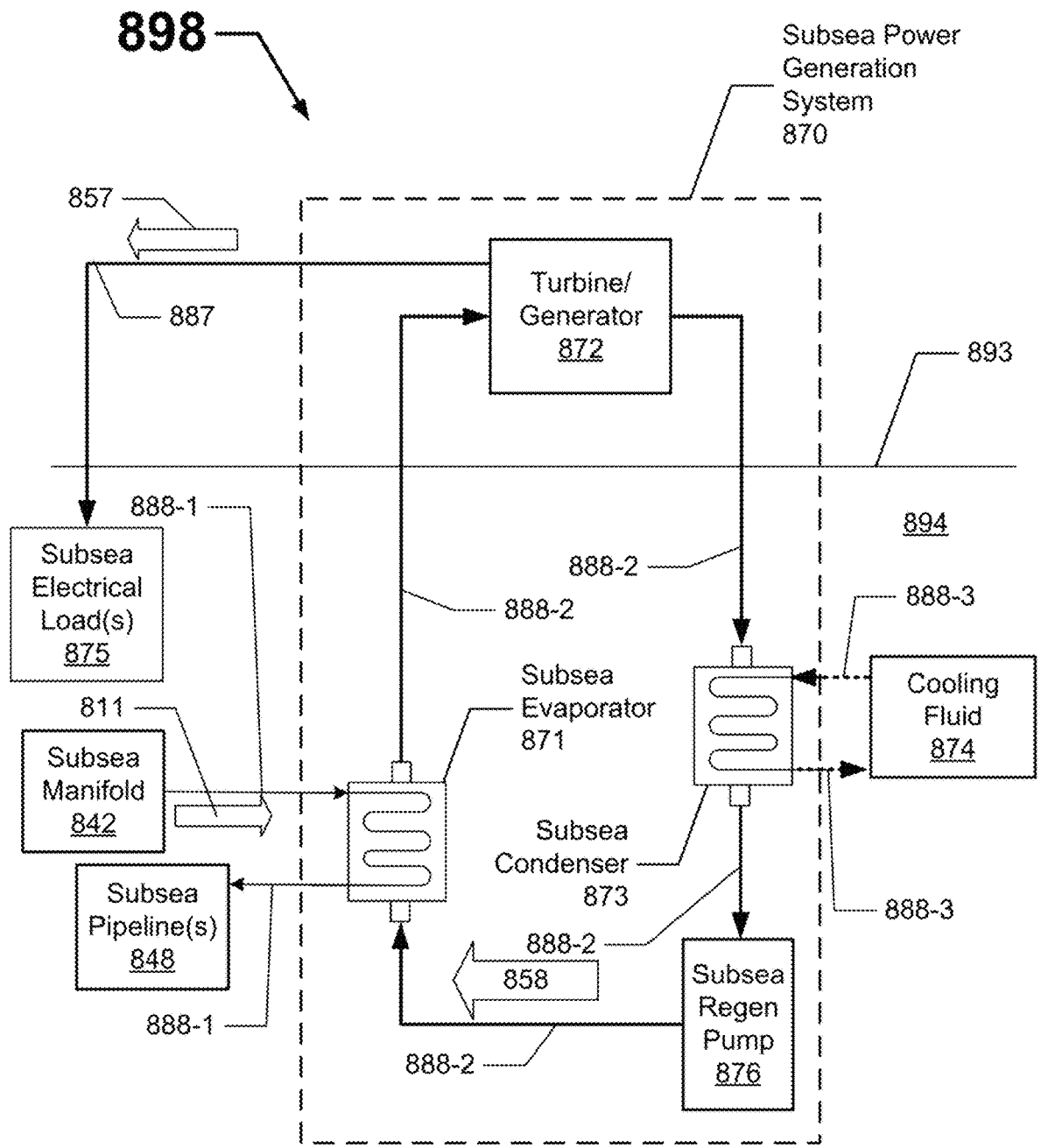
FIG. 8 shows a block diagram of another subsystem based on the configuration of the system of FIG. 2 for heat recovery and utilization from subsea field operations according to certain example embodiments.

FIG. 8 shows a block diagram of another subsystem 898 based on the configuration of the system 200 of FIG. 2 for heat recovery and utilization from subsea field operations according to certain example embodiments. Referring to FIGS. 1 through 8, the subsystem 898 includes a subsea manifold 842, one or more subsea pipelines 848, one or more subsea electrical loads 875, cooling fluid 874, and a subsea power generation system 870, all of which are located in water 894. The subsea manifold 842, the subsea pipelines 848, the subsea electrical loads 875, the piping 888 (e.g., piping 888-1, piping 888-2, piping 888-3), and the subsea power generation system 870 can be substantially the same as the subsea manifold 242, the subsea pipelines 248, the subsea electrical loads 275, the piping 288, and the subsea power generation system 270 discussed above with respect to FIG. 2.

The subsystem 898 of FIG. 8 is substantially the same as the subsystem 798 of FIG. 7, except that the subsea power generation system 870 of the subsystem 898 of FIG. 8 does not include a subsea power manipulation module (e.g., the subsea power manipulation module 756), and the turbine/generator 872 is located above the water line 893 instead of in the water 894. In this case, the subsea power generation system 870 includes a subsea evaporator 871, the turbine/generator 872, a subsea condenser 873, and a subsea regen pump 876. The subsea evaporator 871, the turbine/generator 872, the subsea condenser 873, and the subsea regen pump 876 are connected to each other in a closed loop using piping 888-2 and through which a working fluid 858 flows.

The process utilized by the subsea power generation system 870 of FIG. 8 can begin with a subterranean resource 811 flowing from the subsea manifold 842 through piping 888-1 that is one part of the subsea evaporator 871. The subterranean resource 811 has excess heat when flowing out of the subsea manifold 842, and this excess heat can be transferred from the subterranean resource 811 within the subsea evaporator 871 to the working fluid 858, which is flowing through piping 888-2 that is another part of the subsea evaporator 871. The subterranean resource 811, after flowing through the first part of the subsea evaporator 871 and having cooled from the loss of at least some of the excess heat, flows through more piping 888-1 to one or more of the subsea pipelines 848.

The working fluid 858, heated from the excess heat within the second part of the subsea evaporator 871, exits the subsea evaporator 871 through more piping 888-2 and flows to the turbine/generator 872 above the water line 893 (e.g., on a topsides 107 of a floating structure 103 or a land-based structure 103). The subsea evaporator 871 can have any of a number of specifications. When the working fluid 858 enters the turbine/generator 872, the heated working fluid 858 enables the turbine to cause the generator to rotate at a sufficient rate to generate electrical power 857, which flows to one or more of the subsea electrical loads 875 through one or more power transfer links 887. The turbine of the turbine/generator 872 can have any of a number of specifications. Because the turbine/generator 872 is not in the water 894, the turbine/generator 872 may not have a housing, such as the housing 759 of FIG. 7. Alternatively, the turbine/generator 872 can include a housing that protects some or all of its components from the environment (e.g., salt air) above the water line 893.

When the working fluid 858 exits the turbine of the turbine/generator 872, the working fluid 858 has cooled (e.g., from 124° F. to 57° F.) and flows through additional piping 888-2 to the subsea condenser 873. The subsea condenser 873 can slightly cool (e.g., from 56.57° F. to 53.84° F.) and depressurize (e.g., from 100 psia to 95 psia) the working fluid 858 using a cooling fluid 874 that flows through a separate part compared to the part through which the working fluid 858 flows and that has a temperature that is lower than the temperature of the working fluid 858 entering the subsea condenser 873. In some cases, the cooling fluid 874 can flow through piping 888-3 that runs through the separate part in the subsea condenser 873. Alternatively, the cooling fluid 874 can be water 894 in the subsea that constantly surrounds the part of the subsea condenser 873 through which the working fluid 858 flows.

From the subsea condenser 873, the working fluid 858 flows through additional piping 888-2 to the subsea regen pump 876, which forces the working fluid 858 to circulate through the closed loop of the piping 888-2. Specifically, the subsea regen pump 876 can dramatically increase the pressure (e.g., from 95 psia to 329 psia) of the working fluid 858 flowing through the piping 888-2 toward the subsea evaporator 871. The subsea regen pump 876 can have any of a number of specifications. In some cases, the subsea regen pump 876 can be a subsea electrical load 875 that receives electrical power 857 from the turbine/generator 872. The working fluid 858 can be any of a number of types of fluid having any of a number of characteristics.

In alternative embodiments, in addition to the turbine/generator 872 of the subsea power generation system 870 being located above the water line 893 (e.g., on a topsides 107 of a floating structure 103 or a land-based structure 103), one or more other components of the subsea power generation system 870 located above the water line 893, as long as at least one component of the subsea power generation system 870 is located in the water 894. For example, in certain alternative embodiments, the subsea evaporator 871 of the subsea power generation system 870 can be located in the water 894, while the turbine/generator 872, the subsea condenser 873, and the subsea regen pump 876 are located above the water line 893.

Figure 9:
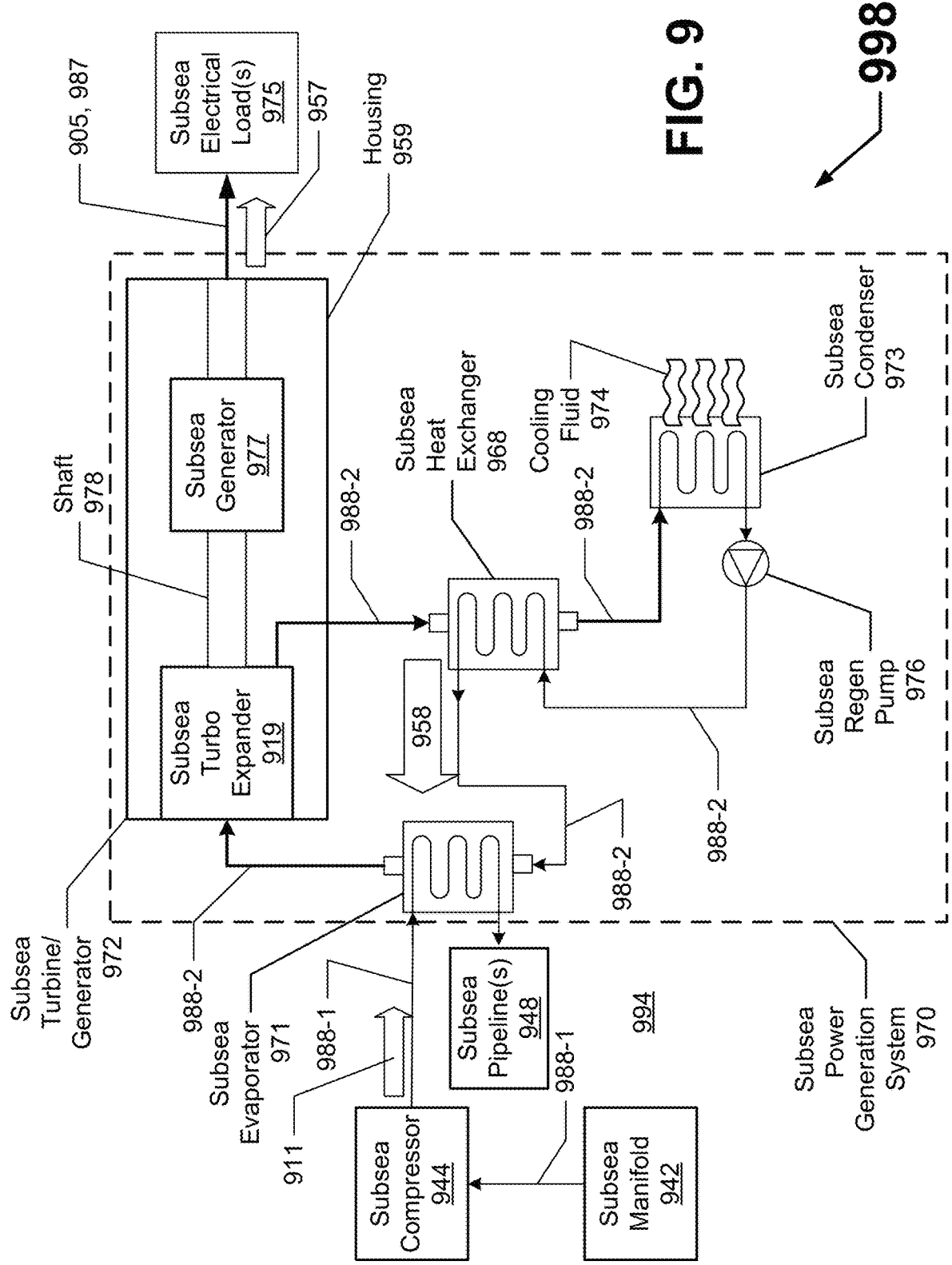
FIG. 9 shows a block diagram of a subsystem based on the configuration of the system of FIG. 4 for heat recovery and utilization from subsea field operations according to certain example embodiments.

FIG. 9 shows a block diagram of a subsystem 998 based on the configuration of the system 400 of FIG. 4 for heat recovery and utilization from subsea field operations according to certain example embodiments. Referring to FIGS. 1 through 9, the subsystem 998 includes a subsea manifold 942, a subsea compressor 944, one or more subsea pipelines 948, one or more subsea electrical loads 975, cooling fluid 974, and a subsea power generation system 970, all of which are located in water 994. The subsea manifold 942, the subsea compressor 944, the subsea pipelines 948, the subsea electrical loads 975, the piping 988 (e.g., piping 988-1, piping 988-2), the communication links 905, the power transfer links 987, and the subsea power generation system 970 of the subsystem 998 of FIG. 9 can be substantially the same as the subsea manifold 442, the subsea compressor 444, the subsea pipelines 448, the subsea electrical loads 475, the piping 488, the communication links 405, the power transfer links 487, and the subsea power generation system 470 discussed above with respect to FIG. 4.

In this case, the subsea power generation system 970 includes a subsea evaporator 971, a subsea turbine/generator 972, a subsea condenser 973, a subsea heat exchanger 968, and a subsea regen pump 976. The subsea evaporator 971, the subsea turbine/generator 972, the subsea condenser 973, the subsea heat exchanger 968, and the subsea regen pump 976 are connected to each other in a closed loop using piping 988-2 and through which a working fluid 958 flows. The process utilized by the subsea power generation system 970 of FIG. 9 can begin with a subterranean resource 911 flowing from the subsea manifold 942 through piping 988-1 to the subsea compressor 944, which both compresses and raises the temperature of the subterranean resource 911. The subterranean resource 911 then flows through additional piping 988-1 from the subsea compressor 944 to one part of the subsea evaporator 971. The subterranean resource 911 has excess heat (from being compressed) when flowing out of the subsea compressor 944, and this excess heat can be transferred from the subterranean resource 911 within the subsea evaporator 971 to the working fluid 958, which is flowing through piping 988-2 that is another part of the subsea evaporator 971. The subterranean resource 911, after flowing through the first part of the subsea evaporator 971 and having cooled from the loss of at least some of the excess heat, flows through more piping 988-1 to one or more of the subsea pipelines 948.

The working fluid 958, heated from the excess heat within the second part of the subsea evaporator 971, exits the subsea evaporator 971 through more piping 988-2 and flows to the subsea turbine/generator 972. The subsea evaporator 971 can have any of a number of specifications. When the working fluid 958 enters the subsea turbine/generator 972, the heated working fluid 958 flows through the subsea turbo expander 919 (subsea turbine) and enables the subsea turbo expander 919 to cause the subsea generator 977 to rotate, through the shaft 978, at a sufficient rate to generate electrical power 957, which flows to one or more of the subsea electrical loads 975 through one or more power transfer links 987. The subsea turbo expander 919 of the subsea turbine/generator 972 can have any of a number of specifications. Because the subsea turbine/generator 972 is in the water 994, the subsea turbine/generator 972 can have a housing 959, such as the housing 759 of FIG. 7.

When the working fluid 958 exits the subsea turbo expander 919 of the subsea turbine/generator 972, the working fluid 958 has cooled (e.g., from 124° F. to 57° F.) and flows through additional piping 988-2 to one part of the subsea heat exchanger 968, and subsequently flows through additional piping 988-2 to the subsea condenser 973. The subsea condenser 973 can slightly cool (e.g., from 56.57° F. to 53.84° F.) and depressurize (e.g., from 100 psia to 95 psia) the working fluid 958 using a cooling fluid 974 (e.g., water 994 in the subsea) that constantly surrounds the part of the subsea condenser 973 through which the working fluid 958 flows.

From the subsea condenser 973, the working fluid 958 flows through additional piping 988-2 to the subsea regen pump 976, which forces the working fluid 958 to circulate through the closed loop of the piping 988-2. Specifically, the subsea regen pump 976 can dramatically increase the pressure (e.g., from 95 psia to 329 psia) of the working fluid 958 flowing through the piping 988-2 toward the subsea heat exchanger 968, where the pressurized working fluid 958 helps to cool the working fluid 958 that had just left the subsea turbo expander 919 while also pre-heating the working fluid 958 flowing through the other part of the subsea heat exchanger 968 that is about to reach the subsea evaporator 971. After leaving the heat exchanger 968, the working fluid 958 flows through additional piping 988-2 to the subsea evaporator 971. The subsea regen pump 976 and the subsea heat exchanger 968 can have any of a number of specifications. In some cases, the subsea regen pump 976 can be a subsea electrical load 975 that receives electrical power 957 from the subsea turbine/generator 972. The working fluid 958 can be any of a number of types of fluid having any of a number of characteristics.

Figure 10:
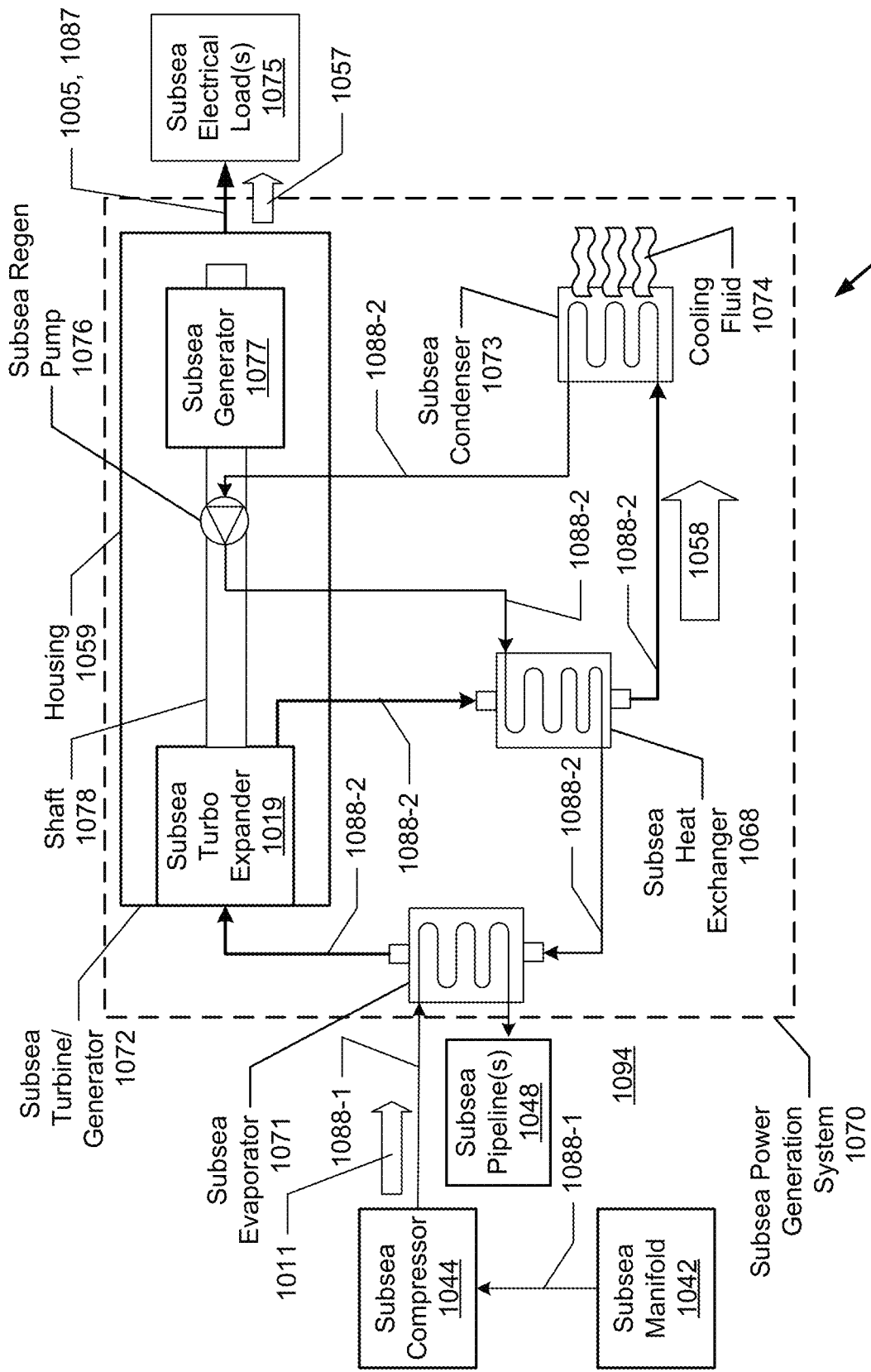
FIG. 10 shows a block diagram of another subsystem based on the configuration of the system of FIG. 4 for heat recovery and utilization from subsea field operations according to certain example embodiments.

FIG. 10 shows a block diagram of another subsystem 1098 based on the configuration of the system 400 of FIG. 4 for heat recovery and utilization from subsea field operations according to certain example embodiments. Referring to FIGS. 1 through 10, the subsystem 1098 includes a subsea manifold 1042, a subsea compressor 1044, one or more subsea pipelines 1048, one or more subsea electrical loads 1075, cooling fluid 1074, and a subsea power generation system 1070, all of which are located in water 1094. The subsea manifold 1042, the subsea compressor 1044, the subsea pipelines 1048, the subsea electrical loads 1075, the piping 1088 (e.g., piping 1088-1, piping 1088-2), the communication links 1005, the power transfer links 1087, and the subsea power generation system 1070 of the subsystem 1098 of FIG. 10 can be substantially the same as the subsea manifold 442, the subsea compressor 444, the subsea pipelines 448, the subsea electrical loads 475, the piping 488, the communication links 405, the power transfer links 487, and the subsea power generation system 470 discussed above with respect to FIG. 4.

The subsystem 1098 of FIG. 10 is substantially the same as the subsystem 998 of FIG. 9, except that the subsea power generation system 1070 of the subsystem 1098 of FIG. 10 has a different configuration compared to the configuration of the subsea power generation system 970 of the subsystem 998 of FIG. 9. Specifically, as with the subsea power generation system 970 of FIG. 9, the subsea power generation system 1070 of FIG. 10 includes a subsea evaporator 1071, a subsea turbine/generator 1072, a subsea condenser 1073, a subsea heat exchanger 1068, and a subsea regen pump 1076. However, the arrangement of the components of the subsea power generation system 1070 differs, as discussed below.

The subsea evaporator 1071, the subsea turbine/generator 1072, the subsea condenser 1073, the subsea heat exchanger 1068, and the subsea regen pump 1076 are connected to each other in a closed loop using piping 1088-2 and through which a working fluid 1058 flows. The process utilized by the subsea power generation system 1070 of FIG. 10 can begin with a subterranean resource 1011 flowing from the subsea manifold 1042 through piping 1088-1 to the subsea compressor 1044. The subterranean resource 1011 then flows through additional piping 1088-1 from the subsea compressor 1044 to one part of the subsea evaporator 1071. The subterranean resource 1011 has excess heat when flowing out of the subsea compressor 1044, and this excess heat can be transferred from the subterranean resource 1011 within the subsea evaporator 1071 to the working fluid 1058, which is flowing through piping 1088-2 that is another part of the subsea evaporator 1071. The subterranean resource 1011, after flowing through the first part of the subsea evaporator 1071 and having cooled from the loss of at least some of the excess heat, flows through more piping 1088-1 to one or more of the subsea pipelines 1048.

The subsea evaporator 1071, the subsea turbine/generator 1072, the subsea condenser 1073, the subsea heat exchanger 1068, and the subsea regen pump 1076 are connected to each other in a closed loop using piping 1088-2 and through which a working fluid 1058 flows. The process utilized by the subsea power generation system 1070 of FIG. 10 can begin with a subterranean resource 1011 flowing from the subsea manifold 1042 through piping 1088-1 to the subsea compressor 1044. The subterranean resource 1011 then flows through additional piping 1088-1 from the subsea compressor 1044 to one part of the subsea evaporator 1071. The subterranean resource 1011 has excess heat when flowing out of the subsea compressor 1044, and this excess heat can be transferred from the subterranean resource 1011 within the subsea evaporator 1071 to the working fluid 1058, which is flowing through piping 1088-2 that is another part of the subsea evaporator 1071. The subterranean resource 1011, after flowing through the first part of the subsea evaporator 1071 and having cooled from the loss of at least some of the excess heat, flows through more piping 1088-1 to one or more of the subsea pipelines 1048.

The working fluid 1058, heated from the excess heat within the second part of the subsea evaporator 1071, exits the subsea evaporator 1071 through more piping 1088-2 and flows to the subsea turbine/generator 1072. The subsea evaporator 1071 can have any of a number of specifications. When the working fluid 1058 enters the subsea turbine/generator 1072, the heated working fluid 1058 flows through the subsea turbo expander 1019 (subsea turbine) and enables the subsea turbo expander 1019 to cause the subsea generator 1077 to rotate, through the shaft 1078, at a sufficient rate to generate electrical power 1057, which flows to one or more of the subsea electrical loads 1075 through one or more power transfer links 1087. The subsea turbo expander 1019 of the subsea turbine/generator 1072 can have any of a number of specifications. Because the subsea turbine/generator 1072 is in the water 1094, the subsea turbine/generator 1072 can have a housing 1059, such as the housing 759 of FIG. 7.

When the working fluid 1058 exits the subsea turbo expander 1019 of the subsea turbine/generator 1072, the working fluid 1058 has cooled (e.g., from 124° F. to 57° F.) and flows through additional piping 1088-2 to one part of the subsea heat exchanger 1068, and subsequently flows through additional piping 1088-2 to the subsea condenser 1073. A function served by the subsea heat exchanger 1068 is to pre-heat the working fluid 1058 before the working fluid 1058 reaches the subsea evaporator 1071. The subsea condenser 1073 can slightly cool (e.g., from 56.57° F. to 53.84° F.) and depressurize (e.g., from 100 psia to 95 psia) the working fluid 1058 using a cooling fluid 1074 (e.g., water 1094 in the subsea) that constantly surrounds the part of the subsea condenser 1073 through which the working fluid 1058 flows.

From the subsea condenser 1073, the working fluid 1058 flows through additional piping 1088-2 to the subsea regen pump 1076, which in this case is integrated with (e.g., powered by the rotation of, mechanically coupled to) the shaft 1078 of the subsea turbine/generator 1072. The subsea regen pump 1076 forces the working fluid 1058 to circulate through the closed loop of the piping 1088-2. Specifically, the subsea regen pump 1076 can dramatically increase the pressure (e.g., from 95 psia to 329 psia) of the working fluid 1058 flowing through the piping 1088-2 toward the subsea heat exchanger 1068, where the pressurized working fluid 1058 helps to cool the working fluid 1058 that had just left the subsea turbo expander 1019. After leaving the heat exchanger 1068, the working fluid 1058 flows through additional piping 1088-2 to the subsea evaporator 1071. The subsea regen pump 1076 and the subsea heat exchanger 1068 can have any of a number of specifications. The working fluid 1058 can be any of a number of types of fluid having any of a number of characteristics.

In alternative embodiments, in addition to or in the alternative of the subsea turbine/generator 1072 (or portion thereof) being mechanically coupled to the subsea regen pump 1076, the subsea turbine/generator 1072 (or portion thereof) can be mechanically coupled to another component of the subsystem 1098 that is disposed in the water 1094. For example, the subsea turbine/generator 1072 (or portion thereof) can be mechanically coupled to the subsea compressor 1044. In such cases, the generator part of the subsea turbine/generator 1072 can be optional. In other words, in such cases where the subsea turbine/generator 1072 has no generator, the turbine part of the subsea turbine/generator 1072 can be used to offload the subsea compressor 1044, resulting in a reduction in the need for external energy.

Figure 11:
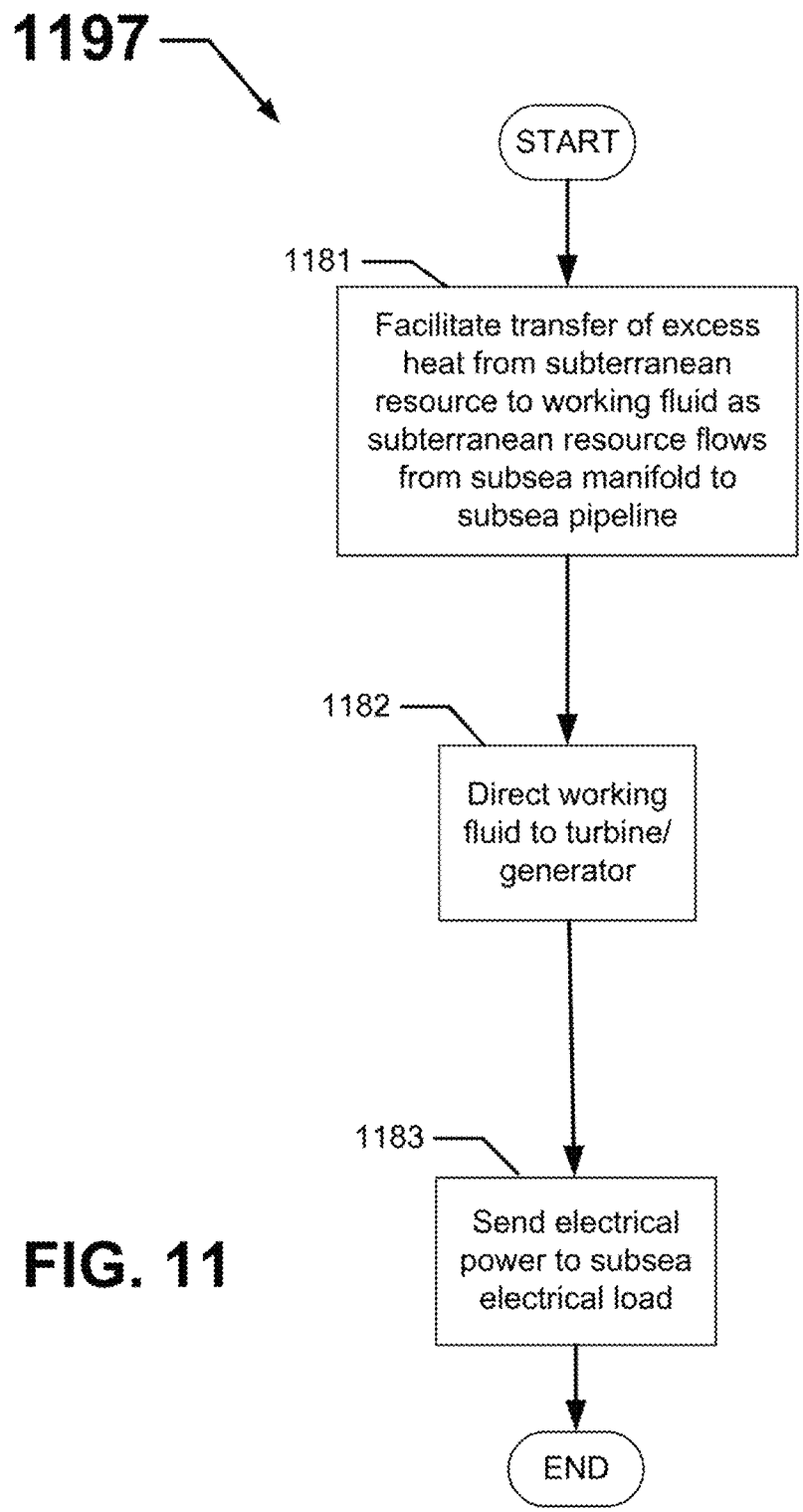
FIG. 11 shows a flowchart of a method for heat recovery and utilization from subsea field operations according to certain example embodiments.

FIG. 11 shows a flowchart 1197 of a method for heat recovery and utilization from subsea field operations according to certain example embodiments. While the various steps in this flowchart 1197 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 11 may be included in performing this method. Accordingly, the specific arrangement of steps should not be construed as limiting the scope. Further, a particular computing device, such as the computing device discussed above with respect to FIG. 6, can be used to perform one or more of the steps for the method shown in FIG. 11 in certain example embodiments. Any of the functions performed below by a controller (e.g., controller 404) can involve the use of one or more protocols (e.g., protocols 532), one or more algorithms (e.g., algorithms 533), and/or stored data (e.g., stored data 534). Alternatively, a user (e.g., user 451), including an associated user system (e.g., user system 455) can perform some or all of the method set forth in FIG. 11.

For illustrative purposes, the method shown in FIG. 11 is described an example that can be performed by using the example subsystem 998 based on the system 400 of FIG. 4. The method of FIG. 11 can also be performed using any of the other systems (e.g., system 200 of FIG. 2, system 300 of FIG. 3), subsystems (e.g., subsystem 798, subsystem 898, subsystem 1098), and/or variations thereof that are described herein. Further, systems for heat recovery and utilization from subsea field operations can perform other functions using other methods in addition to and/or aside from those shown in FIG. 11.

Referring to FIGS. 1 through 11, the method shown in the flowchart 1197 of FIG. 11 begins at the START step and proceeds to step 1181, where transfer of excess heat radiated from a subterranean resource 911 to a working fluid 958 is facilitated as the subterranean resource 911 flows from a subsea manifold 942 to a subsea pipeline 948. In some cases, the subterranean resource 911 can pass through one or more other components (e.g., the subsea compressor 944 of FIG. 9, the subsea pump 1044 of FIG. 10) before the excess heat from the subterranean resource 911 is transferred to the working fluid 958. In any case, the subterranean resource 911 flows through piping 988-1 between the subsea manifold 942 and the subsea pipelines 948.

The transfer can be facilitated by a subsea power generation system 970 or portion thereof. The transfer can also be facilitated using a controller 404 and/or a user 451. When a controller 404 is involved in the transfer, the controller 404 can use one or more protocols 532 and/or one or more algorithms 533 to help facilitate the transfer. The subsea power generation system 970 can include one or more components, such as the subsea evaporator 971 and the subsea regen pump 976, to facilitate the transfer. In such cases, the subsea evaporator 971 and the subsea regen pump 976 are located in water 994. The working fluid 958 flows through piping 988-2, which can be part of a closed loop system.

In step 1182, the working fluid 958 is directed to a turbine/generator 972. For example, the working fluid 958 can be directed to a subsea turbo expander 973 of the turbine/generator 972. The turbine/generator 972 can be part of the subsea power generation system 970. The turbine/generator 972 can be located subsea (in the water 994) or above a water line (e.g., water line 893). The working fluid 958 can be directed to the turbine/generator 972 through piping 988-2. The heat absorbed by the working fluid 958 in step 1181 can be used to cause the subsea generator 977 of the turbine/generator 972 to rotate, through the shaft 978 of the turbine/generator 972, at a sufficient rate to generate electrical power 957. Control of the subsea regen pump 976 to move the working fluid 957 through the piping 988-2 can be performed by a user 451 (including an associated user system 455) and/or by a controller 404 using one or more protocols 532 and/or one or more algorithms 533.

In step 1183, electrical power 957 is sent to a subsea electrical load 975. The electrical power 957 can be sent to the subsea electrical load 975 using one or more power transfer links 987. In some cases, the subsea power generation system 970 can include a subsea power manipulation module (e.g., subsea power manipulation module 756) to put the electrical power 957 into the type and level of power that is used by the subsea electrical load 975. Sending the electrical power 957 to the subsea electrical load 975 and/or operating an optional subsea power manipulation module can be performed by a user 451 (including an associated user system 455) and/or by a controller 404 using one or more protocols 532 and/or one or more algorithms 533.

As discussed above with respect to FIG. 10, in alternative embodiments, in addition to or as an alternative to generating electrical power, the shaft 978 driven by the subsea turbo expander 973 can be mechanically coupled to the subsea compressor 944, the subsea regen pump 1076, and/or some other mechanically-driven component of a system to fully or partially drive that subsea compressor 944, subsea regen pump 1076, and/or other mechanically-driven component of the system. When step 1183 is complete, the process can proceed to the END step.

Alternatively, there can be a point in time over the continuous process of the method of FIG. 11 where the subsea power generation system 970, or portion thereof, is undersized for the amount of heat transferred to the working fluid 958, fails to operate properly, or has some other problem. In such cases, the subsea power generation system 970 can be fully or partially bypassed by operating one or more valves 985 integrated with the piping 988-1. In some cases, bypassing the subsea power generation system 970 directs the subterranean resource 911 to flow through another component (e.g., a subsea process cooler 446) that itself would normally be bypassed when the subsea power generation system 970 is in use.

The operation of the valves 985 and/or the decision to operate the valves 985 and how much to operate the valves 985 and for how long to leave the operated valves 985 in the new position can be performed by a user 451 (including an associated user system 455) and/or by a controller 404 using one or more protocols 532 and/or one or more algorithms 533. As another alternative, the subsea power generation system 970 can be physically removed from the subsystem 998 using disconnects (disconnects 449) integrated with the piping 988-1 without interrupting the flow of the subterranean resource 911 through the piping 988-1 from the subsea manifold 942 and the subsea pipelines 948.

Example embodiments can be used to provide for utilizing, in real time, excess heat in a subterranean resource in a subsea environment to generate electrical power for use by a subsea electrical load. Example embodiments can be used during a stage of a field operation when the subterranean resource is directed to a subsea pipeline. At the very least, the transfer of excess heat from the subterranean resource to a working fluid within an example subsea power generation system is performed subsea. In some cases, the electrical power can be generated by the example subsea power generation system in the subsea environment. Example embodiments are designed for prolonged reliable operation in spite of the harsh subsea environment in which example embodiments operate. Example embodiments can provide a number of benefits. Such other benefits can include, but are not limited to, improved system efficiency, reduced use of resources, cost savings, operational flexibility, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for utilizing heat from a subterranean resource during a subsea field operation, the system comprising:
a subsea manifold configured to transfer the subterranean resource from a subsea Christmas tree disposed subsea above a seabed atop a wellbore and adjacent to a pipeline located subsea, wherein the subterranean resource retains the heat while being transferred out of the subsea manifold disposed adjacent to the subsea Christmas tree, wherein at least some of the heat from the subterranean resource originates from a subterranean formation through which the wellbore is drilled, and wherein the subterranean resource is extracted from the subterranean formation through the wellbore and passed through the subsea Christmas tree before reaching the subsea manifold; and
a subsea power generation system comprising a subsea heat exchanger and a turbine/generator, wherein the subsea heat exchanger is located subsea above the seabed, wherein the subsea heat exchanger is configured to receive the heat from the subterranean resource as the subterranean resource is transferred from the subsea manifold to the pipeline, wherein the subsea heat exchanger uses the heat to raise a temperature of a working fluid, and wherein energy from heating the working fluid is used by the turbine/generator to generate electrical power.

2. The system of claim 1, wherein the turbine/generator is located subsea.

3. The system of claim 1, further comprising:
a subsea compression module that receives the subterranean resource from the subsea manifold, wherein the subsea compression module delivers the subterranean resource to the pipeline, and wherein the subsea power generation system uses the excess heat as the subterranean resource is transferred from the subsea compression module to the pipeline.

4. The system of claim 3, wherein the excess additional heat is created when the subterranean resource is compressed by the subsea compression module.

5. The system of claim 3, further comprising:
a subsea cooling module positioned in parallel with the subsea power generation system between the subsea compression module and the pipeline; and
a valve arrangement integrated with piping between the subsea compression module and the pipeline, where in the valve arrangement has a first position and a second position, wherein the valve arrangement, when in the first position, allows the subterranean resource to pass through the subsea power generation system to the pipeline, and wherein the valve arrangement, when in the second position, allows the subterranean resource to pass through the subsea cooling module to the pipeline.

6. The system of claim 5, wherein the subsea power generation system is removable from the piping using a disconnect during the subsea field operation when the valve arrangement is in the second position without interrupting the subsea field operation.

7. The system of claim 1, further comprising:
a subsea pumping module that receives the subterranean resource from the subsea manifold, wherein the subsea pumping module delivers the subterranean resource to the pipeline, and wherein the subsea power generation system uses the heat as the subterranean resource is transferred from the subsea pumping module to the pipeline.

8. The system of claim 1, further comprising:
a subsea electrical load that receives the electrical power generated by the subsea power generation system, wherein the subsea electrical load comprises an energy storage device that receives the electrical power generated by the subsea power generation system to charge the subsea energy storage module, wherein the subsea energy storage module provides power to another subsea component of the system.

9. The system of claim 1, further comprising:
a controller communicably coupled to the subsea power generation system, wherein the controller controls the flow of the heat to and the production of the electrical power by the subsea power generation system.

10. The system of claim 9, further comprising:
a sensor device communicably coupled to the controller, wherein the sensor device is configured to measure a parameter in the subsea associated with utilizing the heat during the subsea field operation, wherein the controller bases control on measurements of the parameter made by the sensor device.

11. The system of claim 1, wherein the turbine/generator is located above a water line.

12. A subsea power generation system for generating electrical power subsea during a subsea field operation, the subsea power generation system comprising:
a subsea heat exchanger configured to receive heat retained by a subterranean resource that is transferred from a subsea manifold to a pipeline located subsea, wherein the heat is used to heat a working fluid in the subsea heat exchanger to a heated state, wherein the subsea heat exchanger is located subsea above a seabed, wherein at least some of the heat from the subterranean resource originates from a subterranean formation through which a wellbore is drilled, and wherein the subterranean resource is extracted from the subterranean formation through the wellbore and passed through a subsea Christmas tree located subsea above the seabed before reaching the subsea manifold located subsea above the seabed; and
a turbine/generator that receives the working fluid in the heated state from the subsea heat exchanger, wherein energy from the working fluid in the heated state is used by the turbine/generator to generate the electrical power subsea, and wherein the turbine/generator is located subsea above the seabed.

13. The subsea power generation system of claim 12, further comprising:
a subsea condenser configured to condense the working fluid into a condensed state after the working fluid flows out of the turbine/generator.

14. The subsea power generation system of claim 13, further comprising:
a subsea regen pump configured to move the working fluid in the condensed state toward an evaporator of the heat exchanger.

15. The subsea power generation system of claim 14, further comprising:
a network of piping through which the working fluid flows, wherein the network of piping forms a closed loop that includes the subsea heat exchanger, the turbine/generator, the subsea condenser, and the subsea regen pump.

16. The subsea power generation system of claim 15, wherein the working fluid comprises at least one fluid selected from a group consisting of ammonia, propane, R134a refrigerant, and another fluid that has thermodynamic critical properties relative to a heat source and a heat sink in the closed loop.

17. The subsea power generation system of claim 14, further comprising:
a controller configured to control the subsea heat exchanger, the turbine/generator, the subsea condenser, and the subsea regen pump.

18. A method for utilizing heat during a subsea field operation, the method comprising:
facilitating, by a subsea power generation system, transfer of the heat retained by a subterranean resource to a working fluid as the subterranean resource flows from a subsea manifold located subsea above a seabed to a subsea pipeline, wherein the subsea power generation system comprises a subsea heat exchanger and a turbine/generator, wherein the subsea heat exchanger is located subsea above the seabed, wherein the subsea heat exchanger is configured to receive the heat from the subterranean resource, wherein the subsea heat exchanger uses the heat to raise a temperature of the working fluid, wherein at least some of the heat from the subterranean resource originates from a subterranean formation through which a wellbore is drilled, and wherein the subterranean resource is extracted from the subterranean formation through the wellbore and passed through a subsea Christmas tree located subsea above the seabed before reaching the subsea manifold;

directing the working fluid, heated by the heat, to a turbine/generator of the subsea power generation system; and sending electrical power, generated by the turbine/generator using energy from the working fluid, to a subsea electrical load.

19. The method of claim 18, further comprising:

redirecting the subterranean resource with the heat from the subsea power generation system to a subsea cooling module when the subsea power generation system is offline.

20. The method of claim 18, wherein the turbine/generator is located subsea and comprises a housing that is pressure retaining or pressure compensated.

* * * * *